US011049499B2

(12) United States Patent
Li et al.

(10) Patent No.: US 11,049,499 B2
(45) Date of Patent: Jun. 29, 2021

(54) COMMUNICATION METHOD, SERVER, AND DEVICE

(71) Applicant: Huawei Technologies Co., Ltd., Shenzhen (CN)

(72) Inventors: Xiaojuan Li, Beijing (CN); Yahui Wang, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 15/752,139

(22) PCT Filed: Aug. 1, 2016

(86) PCT No.: PCT/CN2016/092736
§ 371 (c)(1),
(2) Date: Feb. 12, 2018

(87) PCT Pub. No.: WO2017/028678
PCT Pub. Date: Feb. 23, 2017

(65) Prior Publication Data
US 2018/0247645 A1 Aug. 30, 2018

(30) Foreign Application Priority Data
Aug. 19, 2015 (CN) .......................... 201510511714.3

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
CPC ...... G10L 15/22; G10L 15/1815; G10L 15/30; G10L 2015/088; G10L 2015/223; G10L 15/00; G06F 3/167
(Continued)

(56) References Cited

U.S. PATENT DOCUMENTS 6,128,571 A * 10/2000 Ito ...................... G01C 21/3679
340/995.24
8,340,975 B1 * 12/2012 Rosenberger .......... G10L 15/22
704/275
(Continued)

FOREIGN PATENT DOCUMENTS

CN 102831894 A 12/2012
CN 103226949 A 7/2013
(Continued)

OTHER PUBLICATIONS

Machine Translation and Abstract of Chinese Publication No. CN103561175, Feb. 5, 2014, 15 pages.
(Continued)

*Primary Examiner* — Michael Colucci
(74) *Attorney, Agent, or Firm* — Conley Rose, P.C.

(57) ABSTRACT

A method includes receiving information from each device in multiple devices of one user, where the information includes a device type, determining, according to at least the received information, a device responding to a voice instruction in the multiple devices, and sending a message to a device different from the device responding to a voice instruction in the multiple devices, where the message is used to instruct a voice assistant of the different device not to respond to the voice instruction.

20 Claims, 19 Drawing Sheets

(51) Int. Cl.
*G10L 15/18* (2013.01)
*G10L 15/30* (2013.01)
*G10L 15/08* (2006.01)
*H04L 12/40* (2006.01)

(52) U.S. Cl.
CPC ........ *G10L 15/30* (2013.01); *G10L 2015/088* (2013.01); *G10L 2015/223* (2013.01); *H04L 12/40* (2013.01)

(58) Field of Classification Search
USPC ........................................... 704/257
See application file for complete search history.

(56) References Cited

U.S. PATENT DOCUMENTS

| | | | |
|---|---|---|---|
| 8,453,058 | B1 | 5/2013 | Coccaro et al. |
| 9,703,350 | B2* | 7/2017 | Nigam ................. G06F 1/3206 |
| 10,325,603 | B2* | 6/2019 | Li ......................... G10L 17/04 |
| 10,403,291 | B2* | 9/2019 | Moreno ................. G10L 17/18 |
| 2002/0069063 | A1 | 6/2002 | Buchner et al. |
| 2004/0184431 | A1 | 9/2004 | Park |
| 2007/0203699 | A1 | 8/2007 | Nagashima |
| 2011/0177780 | A1* | 7/2011 | Sato ....................... H04W 36/14 455/41.1 |
| 2012/0034904 | A1 | 2/2012 | Lebeau et al. |
| 2013/0110518 | A1 | 5/2013 | Gruber et al. |
| 2013/0325454 | A1 | 12/2013 | Levien et al. |
| 2013/0325484 | A1 | 12/2013 | Chakladar et al. |
| 2014/0075385 | A1* | 3/2014 | Wan ................... G06Q 30/0601 715/812 |
| 2014/0278435 | A1* | 9/2014 | Ganong, III ............ G10L 15/22 704/275 |
| 2014/0334644 | A1* | 11/2014 | Selig ....................... G06F 3/165 381/108 |
| 2014/0342762 | A1* | 11/2014 | Hajdu ............... H04M 1/72412 455/466 |
| 2015/0006184 | A1 | 1/2015 | Marti et al. |
| 2015/0019714 | A1* | 1/2015 | Shaashua ............ H04L 12/2818 709/224 |
| 2015/0039319 | A1 | 2/2015 | Mei et al. |
| 2015/0066158 | A1* | 3/2015 | Kim ....................... H04L 12/283 700/3 |
| 2015/0081296 | A1 | 3/2015 | Lee et al. |
| 2016/0050315 | A1* | 2/2016 | Malhotra ............. H04M 1/6075 455/414.1 |
| 2016/0104480 | A1* | 4/2016 | Sharifi ..................... G10L 15/32 704/254 |
| 2016/0155324 | A1* | 6/2016 | Gabai ..................... G08C 17/02 367/198 |
| 2016/0234628 | A1* | 8/2016 | Rahman .............. H04L 63/0823 |
| 2016/0275190 | A1* | 9/2016 | Seed ........................ H04W 4/70 |
| 2016/0364114 | A1* | 12/2016 | Von Dehsen ....... H04L 12/2816 |
| 2016/0366528 | A1* | 12/2016 | Landqvist .............. H04R 27/00 |
| 2017/0295272 | A1* | 10/2017 | Gan ....................... H04M 1/725 |

FOREIGN PATENT DOCUMENTS

| | | |
|---|---|---|
| CN | 103442138 A | 12/2013 |
| CN | 103456306 A | 12/2013 |
| CN | 103561175 A | 2/2014 |
| CN | 103945062 A | 7/2014 |
| CN | 104363517 A | 2/2015 |
| CN | 104538030 A | 4/2015 |
| EP | 0911808 A1 | 4/1999 |
| EP | 1063636 A2 | 12/2000 |
| EP | 2669889 A2 | 12/2013 |
| EP | 3133799 A1 | 2/2017 |
| JP | S58208799 A | 12/1983 |
| JP | H11311996 A | 11/1999 |
| JP | 2001013995 A | 1/2001 |
| JP | 2003051887 A | 2/2003 |
| JP | 2003223188 A | 8/2003 |
| JP | 2007226642 A | 9/2007 |
| JP | 2008257566 A | 10/2008 |
| JP | 2014132345 A | 7/2014 |
| KR | 20040082561 A | 9/2004 |
| KR | 20140039961 A | 4/2014 |

OTHER PUBLICATIONS

Machine Translation and Abstract of Chinese Publication No. CN104363517, Feb. 18, 2015, 17 pages.
Machine Translation and Abstract of Chinese Publication No. CN104538030, Apr. 22, 2015, 17 pages.
Foreign Communication From A Counterpart Application, PCT Application No. PCT/CN2016/092736, English Translation of International Search Report dated Nov. 4, 2016, 2 pages.
Foreign Communication From A Counterpart Application, PCT Application No. PCT/CN2016/092736, English Translation of Written Opinion dated Nov. 4, 2016, 5 pages.
Foreign Communication From A Counterpart Application, Japanese Application No. 2018-508731, Japanese Notice of Allowance dated Jul. 8, 2019, 3 pages.
Machine Translation and Abstract of Chinese Publication No. CN103442138, Dec. 11, 2013, 25 pages.
Foreign Communication From A Counterpart Application, Chinese Application No. 201510511714.3, Chinese Office Action dated Oct. 23, 2018, 10 pages.
Foreign Communication From A Counterpart Application, Chinese Application No. 201510511714.3, Chinese Search Report dated Oct. 8, 2018, 3 pages.
Machine Translation and Abstract of Japanese Publication No. JP2003051887, Feb. 21, 2003, 31 pages.
Machine Translation and Abstract of Japanese Publication No. JP2008257566, Oct. 23, 2008, 12 pages.
Takahashi, S., et al., "Home-Network Architecture based on Cooperation among Multiple Sensing and Controlling Devices with Bluetooth Protocol," Technical Report of The Institute of Electronics, Information and Communication Engineers, Jan. 2003, vol. 102, No. 560, pp. 19-24.
Foreign Communication From A Counterpart Application, Japanese Application No. 2018-508731, Japanese Office Action dated Mar. 18, 2019, 3 pages.
Foreign Communication From A Counterpart Application, Japanese Application No. 2018-508731, English Translation of Japanese Office Action dated Mar. 18, 2019, 4 pages.
Foreign Communication From A Counterpart Application, European Application No. 16836542.7, Extended European Search Report dated Jun. 21, 2018, 11 pages.
Foreign Communication From A Counterpart Application, Korean Application No. 10-2018-7005455, Korean Office Action dated Aug. 14, 2019, 7 pages.
Foreign Communication From A Counterpart Application, Korean Application No. 10-2018-7005455, English Translation of Korean Office Action dated Aug. 14, 2019, 8 pages.
Osada, S., et al, "A dialog system for operating home electric appliances using natural language," The Japanese Society for Artificial Intelligence, Research materials, Oct. 1998, SIG-SLUD-9802, pp. 23-30, 8 pages. With an English Abstract.

* cited by examiner

COMMUNICATION METHOD, SERVER, AND DEVICE

CROSS-REFERENCE TO RELATED APPLICATIONS

This application is a U.S. National Stage of International Patent Application No. PCT/CN2016/092736 filed on Aug. 1, 2016, which claims priority to Chinese Patent Application No. 201510511714.3 filed on Aug. 19, 2015, both of which are hereby incorporated by reference in their entireties.

TECHNICAL FIELD

The present disclosure relates to the communications field, and in particular, to a communication method, a server, and a device.

BACKGROUND

At present, most mobile phones have voice assistants. In addition, as voice assistants are integrated into a smart watch, a smart band, and a smart device, a voice assistant is a "standard configuration" in a future device.

After a voice assistant of a device is woken up, the voice assistant of the device performs a corresponding operation according to a received voice instruction. However, because one user may have multiple smart devices, such as a mobile phone, a smart watch, a tablet computer, and a wearable device, when the user sends a voice instruction to wake up a voice assistant, voice assistants of multiple devices are woken up at the same time.

SUMMARY

Embodiments of the present disclosure provide a communication method, a server, and a device such that a device responding to a voice instruction can be determined from multiple devices of one user in order to intelligently select the device responding to a voice instruction.

According to a first aspect, a communication method is provided, including receiving information sent by each device in multiple devices of one user, where the information includes a device type, determining, according to at least the received information, a device responding to a voice instruction in the multiple devices, and sending a message to a device different from the device responding to a voice instruction in the multiple devices, where the message is used to instruct a voice assistant of the different device not to respond to the voice instruction.

With reference to the first aspect, in a first possible implementation, the information further includes at least one of a scene mode of a device or a voice instruction.

With reference to the first aspect or the first possible implementation, in a second possible implementation, when the information includes a device type and a voice instruction, determining, according to at least the received information, a device responding to a voice instruction in the multiple devices includes recognizing semantic meaning of the voice instruction, and determining, according to the device type and the semantic meaning of the voice instruction, the device responding to a voice instruction.

With reference to the first aspect, or the first or the second possible implementation, in a fourth possible implementation, when the information includes a device type and a voice instruction, the method further includes determining an operation corresponding to the voice instruction, and sending, to the device responding to a voice instruction, indication information that is used to indicate the operation.

According to a second aspect, another communication method is provided, including receiving a same voice instruction sent by each device in multiple devices of one user, determining an operation corresponding to the voice instruction, and sending, to a device responding to a voice instruction in the multiple devices, indication information that is used to indicate the operation, where the device responding to a voice instruction is determined according to information sent by each device in the multiple devices, and the information includes a device type.

With reference to the second aspect, in a first possible implementation of the second aspect, the information further includes at least one of a scene mode of a device or a voice instruction.

According to a third aspect, another communication method is provided, including receiving a first voice instruction, entering a wakeup state according to the first voice instruction, obtaining information, where the information includes a device type, sending the information to a server, and receiving a first message sent by the server according to the information, where the first message is used to instruct a voice assistant of the device not to respond to a voice instruction, or receiving a second message sent by the server according to the information, where the second message is used to instruct a voice assistant of the device to respond to a voice instruction.

With reference to the third aspect, in a first possible implementation of the third aspect, the information further includes at least one of a scene mode of the device or a voice instruction.

With reference to the third aspect or the first possible implementation of the third aspect, in a second possible implementation of the third aspect, the method further includes receiving indication information that is sent by the server and is used to indicate an operation corresponding to a voice instruction, where the information further includes the voice instruction.

With reference to the third aspect or the first possible implementation of the third aspect, in a third possible implementation of the third aspect, when the first message sent by the server according to the information is received, the method further includes receiving a second voice instruction, and skip responding to the second voice instruction.

With reference to the third aspect, or the first or the second possible implementation of the third aspect, in a third possible implementation of the third aspect, when the second message sent by the server according to the information is received, the method further includes receiving a third voice instruction, sending the third voice instruction to the server, receiving a third message sent by the server according to the third voice instruction, where the third message is used to indicate an operation corresponding to the third voice instruction, and performing, according to the third message, the operation corresponding to the third voice instruction.

According to a fourth aspect, another communication method is provided, including receiving a first voice instruction, entering a wakeup state according to the first voice instruction, obtaining information, where the information includes a device type, sending the information to a server, receiving a second voice instruction, sending the second voice instruction to the server, and receiving indication information that is sent by the server according to the information and is used to indicate an operation corresponding to the second voice instruction.

With reference to the fourth aspect, in a first possible implementation of the fourth aspect, the information further includes at least one of a scene mode of a device or a voice instruction.

According to a fifth aspect, another communication method is provided, including receiving a first voice instruction, entering a wakeup state according to the first voice instruction, receiving a second voice instruction, and determining that the second voice instruction includes device information, and responding to the second voice instruction.

According to a sixth aspect, a server is provided, including a receiving unit configured to receive information sent by each device in multiple devices of one user, where the information includes a device type, a processing unit configured to determine, according to at least the information received by the receiving unit, a device responding to a voice instruction in the multiple devices, and a sending unit configured to send a message to a device different from the device responding to a voice instruction in the multiple devices, where the message is used to instruct a voice assistant of the different device not to respond to the voice instruction.

With reference to the sixth aspect, in a first possible implementation of the sixth aspect, the information further includes at least one of a scene mode of a device or a voice instruction.

With reference to the sixth aspect or the first possible implementation of the sixth aspect, in a second possible implementation of the sixth aspect, when the information includes a device type and a voice instruction, the processing unit is further configured to recognize semantic meaning of the voice instruction, and determine, according to the device type and the semantic meaning of the voice instruction, the device responding to a voice instruction.

With reference to the sixth aspect, or the first or the second possible implementation of the sixth aspect, in a third possible implementation of the sixth aspect, when the information includes a device type and a voice instruction, the processing unit is further configured to determine an operation corresponding to the voice instruction, and the sending unit is further configured to send, to the device responding to a voice instruction, indication information that is used to indicate the operation.

According to a seventh aspect, another server is provided, including a receiving unit configured to receive a same voice instruction sent by each device in multiple devices of one user, a processing unit configured to determine an operation corresponding to the voice instruction received by the receiving unit, and a sending unit configured to send, to a device responding to a voice instruction in the multiple devices, indication information that is used to indicate the operation, where the device responding to a voice instruction is determined according to information sent by each device in the multiple devices, and the information includes a device type.

With reference to the seventh aspect, in a first possible implementation of the seventh aspect, the information further includes at least one of a scene mode of a device or a voice instruction.

According to an eighth aspect, a device is provided, including a receiving unit configured to receive a first voice instruction, a processing unit configured to enter a wakeup state according to the first voice instruction received by the receiving unit, an obtaining unit configured to obtain information, where the information includes a device type, and a sending unit configured to send the information to a server, where the receiving unit is further configured to receive a first message sent by the server according to the information, where the first message is used to instruct a voice assistant of the device not to respond to a voice instruction, or receive a second message sent by the server according to the information, where the second message is used to instruct a voice assistant of the device to respond to a voice instruction.

With reference to the eighth aspect, in a first possible implementation of the eighth aspect, the information further includes at least one of a scene mode of the device or a voice instruction.

With reference to the eighth aspect or the first possible implementation of the eighth aspect, in a second possible implementation of the eighth aspect, the receiving unit is further configured to receive indication information that is sent by the server and is used to indicate an operation corresponding to a voice instruction, where the information further includes the voice instruction.

With reference to the eighth aspect or the first possible implementation of the eighth aspect, in a third possible implementation of the eighth aspect, when the receiving unit receives the first message, the receiving unit is further configured to receive a second voice instruction, and the processing unit is further configured to skip responding to the second voice instruction received by the receiving unit.

With reference to the eighth aspect or the first or the second possible implementation of the eighth aspect, in a fourth possible implementation of the eighth aspect, when the receiving unit receives the second message, the receiving unit is further configured to receive a third voice instruction, the sending unit is further configured to send, to the server, the third voice instruction received by the receiving unit. The receiving unit is further configured to receive a third message sent by the server according to the third voice instruction, where the third message is used to indicate an operation corresponding to the third voice instruction, and the processing unit is further configured to perform, according to the third message, the operation corresponding to the third voice instruction.

According to a ninth aspect, another device is provided, including a receiving unit configured to receive a first voice instruction, a processing unit configured to enter a wakeup state according to the first voice instruction, an obtaining unit configured to obtain information, where the information includes a device type, and a sending unit configured to send the information to a server, where the receiving unit is further configured to receive a second voice instruction. The sending unit is further configured to send the second voice instruction to the server, and the receiving unit is further configured to receive indication information that is sent by the server according to the information and is used to indicate an operation corresponding to the second voice instruction.

With reference to the ninth aspect, in a first possible implementation of the ninth aspect, the information further includes at least one of a scene mode of the device or a voice instruction.

According to a tenth aspect, another device is provided, including a receiving unit configured to receive a first voice instruction, and a processing unit configured to enter a wakeup state according to the first voice instruction, where the receiving unit is further configured to receive a second voice instruction, and the processing unit is further configured to determine that the second voice instruction includes device information, and respond to the second voice instruction.

According to an eleventh aspect, another server is provided, including one or more processors, a memory, a bus system, a transceiver, and one or more programs, where the processor, the memory, and the transceiver are connected to each other using the bus system, and the one or more programs are stored in the memory and are configured for execution by the one or more processors, the one or more programs include an instruction, and the instruction is used to receive, using the transceiver, information sent by each device in multiple devices of one user, where the information includes a device type, determine, according to at least the information received by the transceiver, a device responding to a voice instruction in the multiple devices, and send, using the transceiver, a message to a device different from the device responding to a voice instruction in the multiple devices, where the message is used to instruct a voice assistant of the different device not to respond to the voice instruction.

With reference to the eleventh aspect, in a first possible implementation of the eleventh aspect, the information further includes at least one of a scene mode of a device or a voice instruction.

With reference to the eleventh aspect or the first possible implementation of the eleventh aspect, in a second possible implementation of the eleventh aspect, when the information includes a device type and a voice instruction, the instruction is further used to recognize voice of the voice instruction, and determine, according to the device type and the semantic meaning of the voice instruction, the device responding to a voice instruction.

With reference to the eleventh aspect, or the first or the second possible implementation of the eleventh aspect, in a third possible implementation of the eleventh aspect, when the information includes a device type and a voice instruction, the instruction is further used to determine an operation corresponding to the voice instruction, and send, using the transceiver to the device responding to a voice instruction in the multiple devices, indication information that is used to indicate the operation.

According to a twelfth aspect, another server is provided, including one or more processors, a memory, a bus system, a transceiver, and one or more programs, where the processor, the memory, and the transceiver are connected to each other using the bus system, and the one or more programs are stored in the memory and are configured for execution by the one or more processors, the one or more programs include an instruction, and the instruction is used to receive, using the transceiver, a same voice instruction sent by each device in multiple devices of one user, determine an operation corresponding to the voice instruction received by the transceiver, and send, using the transceiver to a device responding to a voice instruction in the multiple devices, indication information that is used to indicate the operation, where the device responding to a voice instruction is determined according to information sent by each device in the multiple devices, and the information includes a device type.

With reference to the twelfth aspect, in a first possible implementation of the twelfth aspect, the information further includes at least one of a scene mode of a device or a voice instruction.

According to a thirteenth aspect, another device is provided, including one or more processors, a memory, a bus system, a transceiver, and one or more programs, where the processor, the memory, and the transceiver are connected to each other using the bus system, and the one or more programs are stored in the memory and are configured for execution by the one or more processors, the one or more programs include an instruction, and the instruction is used to receive a first voice instruction using the transceiver, enter a wakeup state according to the first voice instruction received by the transceiver, obtain information, where the information includes a device type, send the information to a server using the transceiver, and receive, using the transceiver, a first message sent by the server according to the information, where the first message is used to instruct a voice assistant of the device not to respond to a voice instruction, or receive, using the transceiver, a second message sent by the server according to the information, where the second message is used to instruct a voice assistant of the device to respond to a voice instruction.

With reference to the thirteenth aspect, in a first possible implementation of the thirteenth aspect, the information further includes at least one of a scene mode of the device or a voice instruction.

With reference to the thirteenth aspect or the first possible implementation of the thirteenth aspect, in a second possible implementation of the thirteenth aspect, the instruction is further used to receive, using the transceiver, indication information that is sent by the server and is used to indicate an operation corresponding to a voice instruction, where the information further includes the voice instruction.

With reference to the thirteenth aspect or the first possible implementation of the thirteenth aspect, in a second possible implementation of the thirteenth aspect, the instruction is further used to receive a second voice instruction using the transceiver when the first message is received using the transceiver, and skip responding to the second voice instruction received by the transceiver.

With reference to the thirteenth aspect or the first possible implementation of the thirteenth aspect, in a third possible implementation of the thirteenth aspect, the instruction is further used to receive a third voice instruction using the transceiver when the second message is received using the transceiver, send the third voice instruction to the server using the transceiver, receive, using the transceiver, a third message sent by the server according to the third voice instruction, where the third message is used to indicate an operation corresponding to the third voice instruction, and perform, according to the third message, the operation corresponding to the third voice instruction.

According to a fourteenth aspect, another device is provided, including one or more processors, a memory, a bus system, a transceiver, and one or more programs, where the processor, the memory, and the transceiver are connected to each other using the bus system, and the one or more programs are stored in the memory and are configured for execution by the one or more processors, the one or more programs include an instruction, and the instruction is used to receive a first voice instruction using the transceiver, enter a wakeup state according to the first voice instruction, obtain information, where the information includes a device type, send the information to a server using the transceiver, receive a second voice instruction using the transceiver, send the second voice instruction to the server using the transceiver, and receive, using the transceiver, indication information that is sent by the server according to the information and is used to indicate an operation corresponding to the second voice instruction.

With reference to the fourteenth aspect, in a first possible implementation of the fourteenth aspect, the information further includes at least one of a scene mode of the device or a voice instruction.

According to a fifteenth aspect, another device is provided, including one or more processors, a memory, a bus system, a transceiver, and one or more programs, where the processor, the memory, and the transceiver are connected to each other using the bus system, and the one or more programs are stored in the memory and are configured for execution by the one or more processors, the one or more programs include an instruction, and the instruction is used to receive a first voice instruction using the transceiver, enter a wakeup state according to the first voice instruction, receive a second voice instruction using the transceiver, determine that the second voice instruction includes device information, and respond to the second voice instruction.

Based on the technical solutions, in the embodiments of the present disclosure, information sent by multiple devices of one user is received, and a device responding to a voice instruction is determined from the multiple devices according to the information. For a user having multiple different devices, a device responding to a voice instruction can be intelligently selected, and more convenient man-machine interaction experience is provided for the user.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show only some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that in various embodiments of the present disclosure, sequence numbers of processes do not mean an execution order. The execution order of the processes should be determined according to functions and internal logic of the processes, and should not be construed as any limitation on the implementation processes of the embodiments of the present disclosure.

It should be understood that, a device involved in this specification refers to a smart device or a mobile device that is closely related to life of a user. For example, the device may include but is not limited to a smartphone, a wearable device, a smart household, and an in-vehicle device. The wearable device may include but is not limited to a smart watch, a band, and smart glasses. In addition, a server involved in this specification may be a voice assistant server in FIG. 1A, or may be another device that can recognize a voice instruction, or may be a controller in FIG. 1B that can recognize a voice instruction.

It should be understood that, "multiple devices of one user" involved in this specification indicates that the multiple devices have a same user account, and the multiple devices remain wirelessly connected using the same user account.

It should be understood that, a "voice instruction" involved in this specification includes a voice operation instruction and/or a voice wakeup instruction.

Figure 1A:
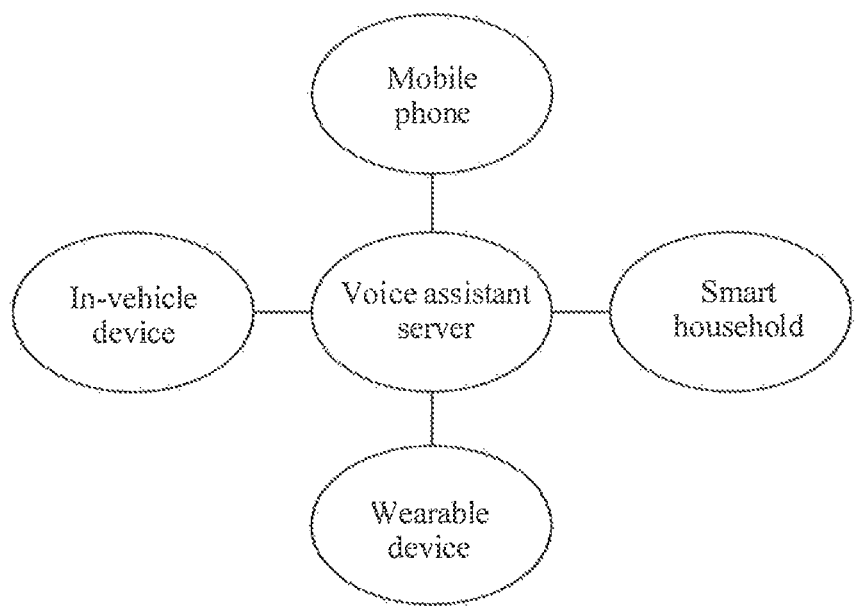
FIG. 1A is a schematic diagram of a scenario to which a communication method according to an embodiment of the present disclosure is applicable.

FIG. 1A is a schematic diagram of a scenario to which a communication method according to an embodiment of the present disclosure is applicable. As shown in FIG. 1A, a voice assistant server communicates with multiple devices of one user, and the multiple devices can simultaneously receive a same voice wakeup instruction or voice operation instruction that is sent by the user. FIG. 1A uses only an example that the voice assistant server communicates with a mobile phone, a wearable device, an in-vehicle device, and a smart household of one user. However, no limitation is imposed on a device in this embodiment of the present disclosure.

Figure 1B:
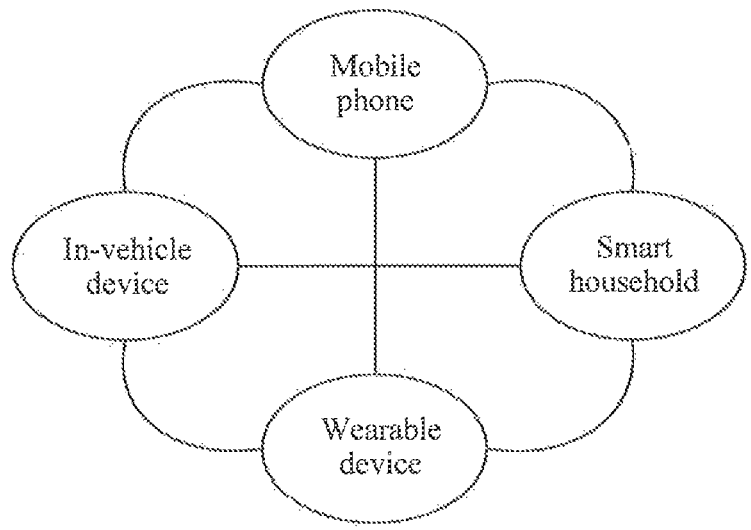
FIG. 1B is a schematic diagram of another scenario to which a communication method according to an embodiment of the present disclosure is applicable.

Optionally, as shown in FIG. 1B, the multiple devices in FIG. 1A may further form an ad hoc network. A controller in the ad hoc network may be an independent device, or may be any device in the multiple devices.

It should be understood that in this embodiment of the present disclosure, a voice assistant may be a processing module integrated into a device, or a client installed in a device. The client corresponding to the voice assistant may display a corresponding icon or interface on a display screen of the device, or may not display a corresponding icon or interface but only runs in a background. The voice assistant may recognize corresponding voice data using pre-stored voice data. The voice assistant in this embodiment of the present disclosure may also be referred to as an intelligent assistant, a personal organizer, or the like. No limitation is imposed in this embodiment of the present disclosure.

The voice assistant server can receive a voice operation parsing request sent by a device, and parse a voice operation instruction carried in the voice operation parsing request in order to determine an operation corresponding to the voice operation instruction, and deliver indication information of the operation to the device.

Figure 2:
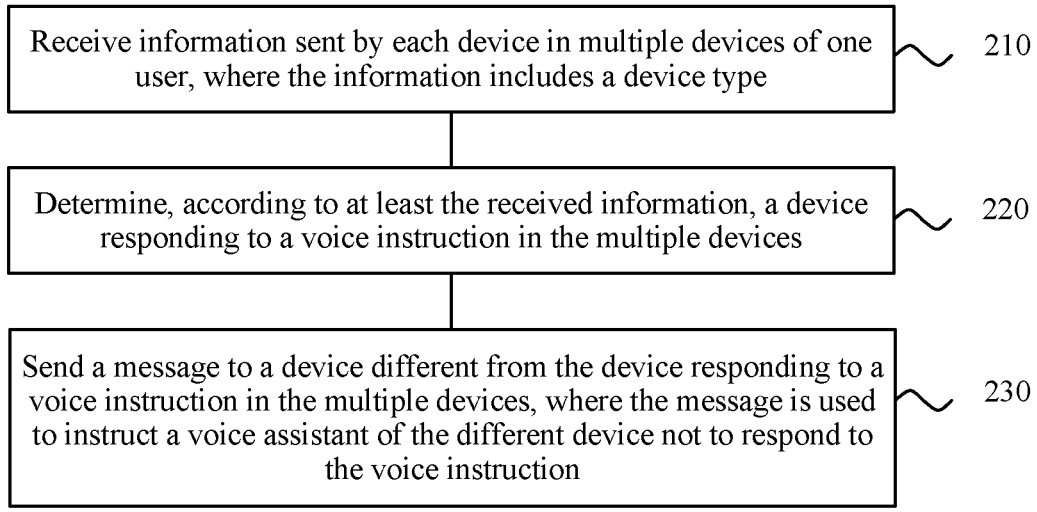
FIG. 2 is a schematic flowchart of a communication method according to an embodiment of the present disclosure.

FIG. 2 is a schematic flowchart of a communication method 200 according to an embodiment of the present disclosure. A server communicates with multiple devices of one user, and the multiple devices can simultaneously receive a same voice instruction sent by the user. The method 200 may be executed by the server (such as a voice assistant server or a controller in an ad hoc network). As shown in FIG. 2, the method 200 includes the following steps.

Step 210: Receive information sent by each device in multiple devices of one user, where the information includes a device type.

Step 220: Determine, according to at least the received information, a device responding to a voice instruction in the multiple devices.

The device responding to a voice instruction performs an operation corresponding to the voice instruction.

Step 230: Send a message to a device different from the device responding to a voice instruction in the multiple devices, where the message is used to instruct a voice assistant of the different device not to respond to the voice instruction.

Optionally, the message may further carry identifier information of the device responding to a voice instruction in order to notify the different device that the device responds to the voice instruction.

A device type of each device may be any one of a mobile phone, a band, an in-vehicle terminal, a stereo, a television (TV), or the like. The device responding to a voice instruction may also be referred to as a preferential response device, a primary device, an execution device, a preferred device, or the like.

For example, the server may pre-store response priority information corresponding to multiple device types, and the server may determine, according to response priorities corresponding to the device types, a device that preferentially responds to a voice instruction. It is assumed that the server pre-stores response priorities, in descending order, corresponding to the following device types, an in-vehicle device, a band, a mobile phone, and a stereo. When the device types received in step 210 are a band, an in-vehicle device, and a mobile phone, the server may determine, according to locally pre-stored response priority information, that the in-vehicle device is the device responding to a voice instruction.

Optionally, in step 230, the message sent to the device different from the device responding to a voice instruction in the multiple devices may further carry sleep instruction information such that a device that does not respond to a voice instruction enters a sleep state according to the sleep instruction information. A low-power voice wakeup module of the device that enters the sleep state is still in a monitoring state, but not responds to a received voice instruction.

In this embodiment of the present disclosure, information sent by multiple devices of one user is received, and a device preferentially responding to a voice instruction is determined from the multiple devices according to the information. For a user having multiple different devices, a device responding to a voice instruction can be intelligently selected, and more convenient and natural man-machine interaction experience is provided for the user.

It should be understood that, when a device of the user does not receive the message sent in step 230, for example, when a device does not receive the message sent by the server within a preset time period, the device may be considered, by default, as the device responding to a voice instruction, that is, the device can respond to a received voice instruction. For example, the device may send, to the server, a voice operation parsing request that carries a voice instruction, request, from the server, an operation corresponding to the voice instruction, and perform the operation. However, no limitation is imposed in this embodiment of the present disclosure. For example, in the method 200, the server may simultaneously send a message to the device responding to a voice instruction in order to instruct the device to respond to a voice instruction. After receiving the message, the device may request, from the server, an operation corresponding to a received voice instruction, and perform the operation.

Optionally, the information sent by each device may further include at least one of a scene mode of a device or a voice instruction.

For example, a scene mode of each device may include any one of the following types, driving, in a living room, in a bedroom, exercising, working, a headset mode, a loudspeaker mode, or the like.

When the information sent by each device includes a device type and a scene mode, the voice assistant server or the controller may pre-store priority information and the like that are of response devices corresponding to different device information, different scene modes, and different device types of one user. For example, the following Table 1 shows a correspondence between a device responding to a voice instruction, and a device type and a scene mode. After receiving device types and scene modes of multiple devices, the server matches the scene modes and the device types with the pre-stored information shown in Table 1. For example, if the scene mode is "driving," and currently received device types include a mobile phone, a band, and an in-vehicle device, the server automatically selects the in-vehicle device as a current device responding to a voice instruction. It should be noted that in Table 1, the device type is used to indicate the device responding to a voice instruction, but no limitation is imposed in this embodiment of the present disclosure. For example, the server may also pre-store a correspondence between a device identifier and a device type. In the correspondence table shown in Table 1, a device identifier may also be used to indicate the device responding to a voice instruction.

It should be further understood that, content shown in Table 1 is only an example, but is not intended to limit the scope of this embodiment of the present disclosure. The server may also pre-store a correspondence between multiple devices for which priorities are set, and a device type, a scene mode and/or semantic meaning, and may preset a device with a relatively high priority in the multiple devices as the device responding to a voice instruction. For example, when device types received by the server do not include a pre-stored device type corresponding to a device with a highest priority, the server determines that a device with a secondary highest priority in the multiple devices is the device responding to a voice instruction, and so on.

the semantic meaning of the voice instruction, and the scene mode, the device responding to a voice instruction from the multiple devices.

As shown in Table 1, the server may also pre-store a correspondence between a device responding to a voice instruction, and a scene mode, a device type, and semantic meaning. For example, if semantic meaning is "listen to music," and obtained device types include a mobile phone, a stereo, and an in-vehicle device, the server continues to obtain scene modes of devices corresponding to the device types, for example, the scene mode is "in a living room," and the server determines that a current device responding to a voice instruction is the stereo. Certainly, the server may determine a scene mode first, and then determine, according to semantic meaning, a current device responding to a voice instruction.

In this embodiment of the present disclosure, the device responding to a voice instruction is determined according to semantic meaning of a voice instruction, a scene mode, and a device type such that a device can be more accurately selected.

Optionally, the method 200 may further include determining an operation corresponding to a voice instruction,

TABLE 1

| Scene mode | Semantic meaning | Device type | Device responding to a voice instruction |
|---|---|---|---|
| Driving | / | Mobile phone, band, and in-vehicle device | In-vehicle device |
| Exercising | / | Mobile phone and band | Band |
| Working | / | Mobile phone and band | Mobile phone |
| / | Make a call | Mobile phone and band | Mobile phone |
| / | Send a short message service (SMS) message | Mobile phone and band | Band |
| Headset mode | Listen to music | Mobile phone and stereo | Mobile phone |
| Loudspeaker mode | Listen to music | Mobile phone and stereo | Stereo |
| In a living room | Listen to music | Mobile phone and stereo | Stereo |
| In a bedroom | Listen to music | Mobile phone and band | Mobile phone |
| In a living room | Watch TV | Mobile phone and TV | TV |
| In a bedroom | Watch TV | Mobile phone and TV | Mobile phone |

When the information sent by each device further includes a device type and a voice instruction, step 220 correspondingly includes recognizing semantic meaning of the voice instruction, and determining, according to the device type and the semantic meaning of the voice instruction, the device responding to a voice instruction from the multiple devices.

As shown in Table 1, the server may also pre-store a correspondence between a device responding to a voice instruction, and a device type and semantic meaning. The server recognizes semantic meaning of a voice instruction. For example, if the semantic meaning is "make a call," and received device types include a mobile phone and a band, the server determines that the device responding to a voice instruction is the mobile phone.

When the information sent by each device includes a device type, a scene mode, and a voice instruction, step 220 further includes recognizing semantic meaning of the voice instruction, and determining, according to the device type, and sending, to the device responding to a voice instruction, indication information that is used to indicate the operation.

It should be noted that, if the controller in the ad hoc network cannot parse a voice instruction, after the controller determines, according to a device type and a scene mode, the device responding to a voice instruction, the controller needs to send a message to the device responding to a voice instruction in order to instruct the device responding to a voice instruction to send, to the server (such as a voice assistant server), a voice operation parsing request that carries the voice instruction.

In conclusion, after determining a device responding to a voice instruction from multiple devices, a server may send a message to a device that does not respond to a voice instruction in the multiple devices in order to instruct a voice assistant of the device that does not respond to a voice instruction not to respond to a received voice instruction or instruct a voice assistant of the device that does not respond to a voice instruction to enter a sleep state. Optionally, the server may simultaneously send a message to the device responding to a voice instruction in order to instruct the device to respond to a received voice instruction. In this case, only a voice assistant of the device responding to a voice instruction sends a voice operation parsing request to the server after receiving a voice operation instruction.

In this embodiment of the present disclosure, information sent by multiple devices of one user is received, and a device preferentially responding to a voice instruction is determined from the multiple devices according to the information. For a user having multiple different devices, a device responding to a voice instruction can be intelligently selected, and more convenient and natural man-machine interaction experience is provided for the user.

Figure 3:
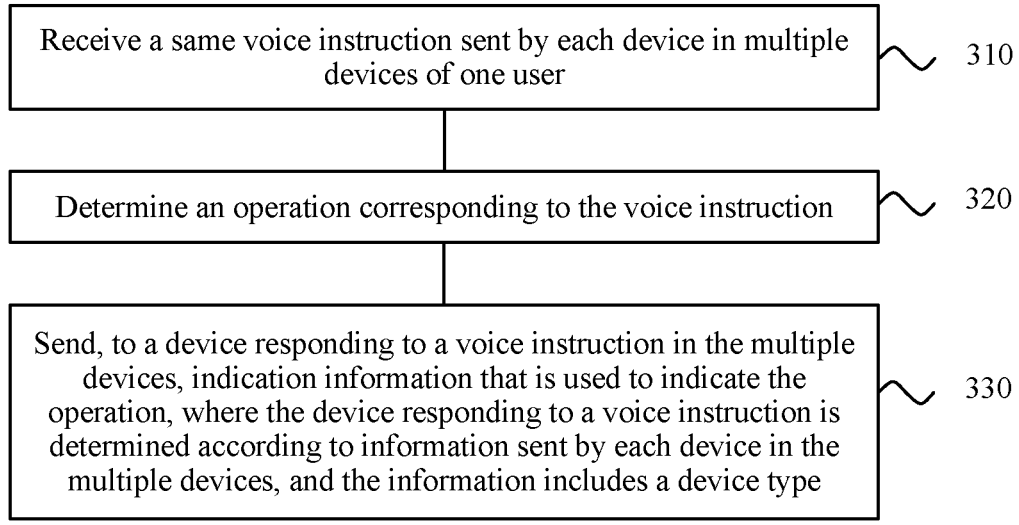
FIG. 3 is a schematic flowchart of a communication method according to another embodiment of the present disclosure.

FIG. 3 is a schematic flowchart of a communication method 300 according to another embodiment of the present disclosure. A server communicates with multiple devices of one user, and the multiple devices can simultaneously receive a same voice instruction sent by the user. The communication method 300 may be executed by the server. As shown in FIG. 3, the communication method 300 includes the following steps.

Step 310: Receive a same voice instruction sent by each device in multiple devices of one user.

Step 320: Determine an operation corresponding to the voice instruction.

Step 330: Send, to a device responding to a voice instruction in the multiple devices, indication information that is used to indicate the operation, where the device responding to a voice instruction is determined according to information sent by each device in the multiple devices, and the information includes a device type.

In this embodiment of the present disclosure, indication information of an operation is automatically sent to a device responding to a voice instruction. For a user having multiple different devices, a device responding to a voice instruction can be intelligently selected, and more convenient and natural man-machine interaction experience is provided for the user.

Optionally, before step 330, the communication method 300 may further include receiving the information sent by each device in the multiple devices of one user, where the information includes a device type, and determining, according to the information, the device responding to a voice instruction in the multiple devices.

It should be understood that, each device may separately send information and a voice instruction, or may simultaneously send information and a voice instruction. No limitation is imposed in this embodiment of the present disclosure.

For example, after determining a response device from the multiple devices, the server continues to receive a voice operation parsing request sent by each device in the multiple devices, and sends indication information of the operation to the device responding to a voice instruction in the multiple devices after determining an operation corresponding to a voice instruction.

Optionally, the communication method 300 may further include sending a message to a device that does not respond to a voice instruction in the multiple devices in order to notify the device that the device responding to a voice instruction performs a corresponding operation, and instruct the device to enter a sleep state.

Optionally, the information sent by each device may further include at least one of a scene mode of a device or a voice instruction.

It should be understood that in this embodiment of the present disclosure, for a method for determining, according to the information sent by each device, the device responding to a voice instruction, reference may be made to related description in the embodiment shown in FIG. 2. To avoid repetition, details are not described herein again.

In this embodiment of the present disclosure, indication information of an operation is automatically sent to a device responding to a voice instruction. For a user having multiple different devices, a device responding to a voice instruction can be intelligently selected, and more convenient and natural man-machine interaction experience is provided for the user.

Figure 4:
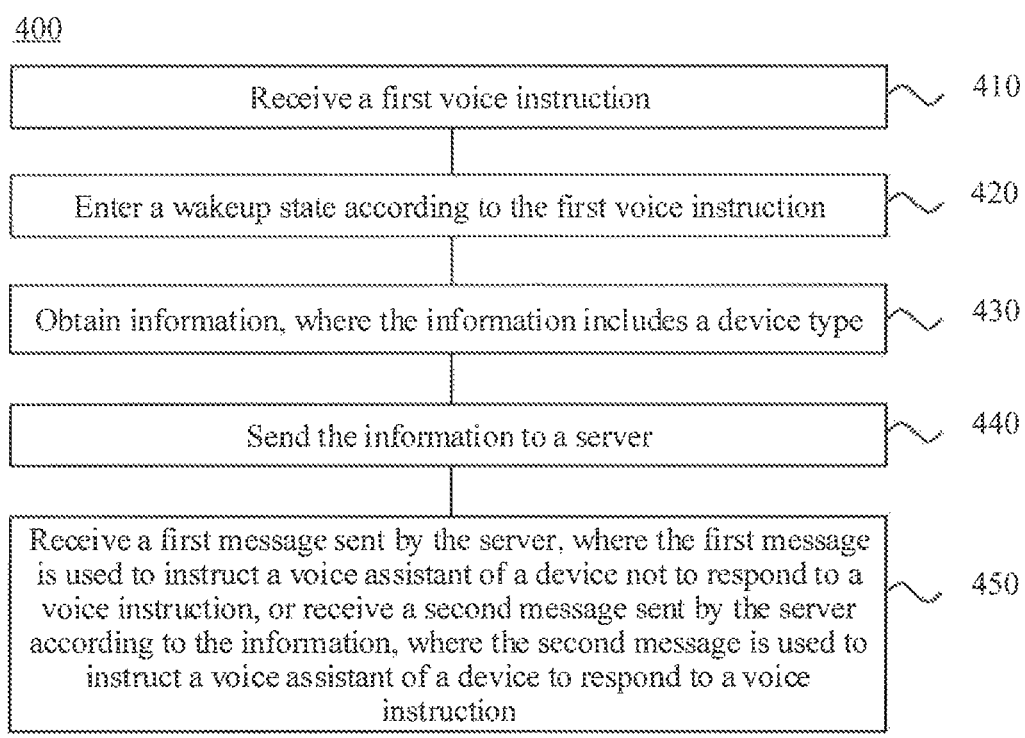
FIG. 4 is a schematic flowchart of a communication method according to another embodiment of the present disclosure.

FIG. 4 is a schematic flowchart of a communication method 400 according to another embodiment of the present disclosure. Multiple devices of one user can simultaneously receive a same voice instruction sent by the user. It should be understood that, a connection status between the multiple devices of one user and a server falls into the following three cases.

1. Voice assistants of all the devices of the user are connected to the server.

2. Voice assistants of some devices of the user are connected to the server, and voice assistants of some other devices are not connected to the server.

3. None of voice assistants of the multiple devices of the user are connected to the server. A voice assistant that is of a device and is not connected to the server may be connected to the server after receiving a voice wakeup instruction sent by the user. Optionally, the multiple devices of one user may further form an ad hoc network.

The communication method 400 may be executed by any device in the multiple devices of one user. Further, the communication method 400 may be executed by a device or a voice assistant of the device. As shown in FIG. 4, the communication method 400 includes the following steps.

Step 410: Receive a first voice instruction.

Step 420: Enter a wakeup state according to the first voice instruction.

For example, the voice assistant of the device enters the wakeup state according to the first voice instruction.

The first voice instruction may be a voice wakeup instruction. The user or a device manufacturer may set, in a unit, a module, or a client corresponding to the voice assistant, content corresponding to the voice wakeup instruction. For example, if a preset voice wakeup instruction is "hi, Allen," the voice assistant enters the wakeup state when receiving a voice instruction "hi, Allen."

Step 430: Obtain information, where the information includes a device type.

Step 440: Send the information to a server.

The server may be a voice assistant server, or may be a controller in the ad hoc network. The device sends the information to the server such that the server can determine, according to the information, whether the device is a device responding to a voice instruction.

Optionally, the information may further include at least one of a scene mode of the device or a voice instruction.

Correspondingly, when the information includes a device type and a voice instruction, it indicates that the device simultaneously sends the device type and the voice instruction to the server. Correspondingly, the communication method 400 may further include receiving indication information that is sent by the server and is used to indicate an operation corresponding to the voice instruction. Obtaining a voice instruction includes receiving the voice instruction.

Step 450: Receive a first message sent by the server according to the information, where the first message is used to instruct a voice assistant of a device not to respond to a voice instruction, or receive a second message sent by the server according to the information, where the second message is used to instruct a voice assistant of a device to respond to a voice instruction.

In this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

In this embodiment of the present disclosure, response duration of the voice assistant of the device after the voice assistant of the device is woken up can be further set, such as 1 minute. That is, after the user wakes up the voice assistant using the voice instruction "hi, Allen," the voice assistant can make a response within the response duration (such as 1 minute) only by directly receiving a voice instruction. For example, after the voice assistant receives a voice instruction such as "hi, Allen, open a map," and completes a voice operation of opening a map, the user may continue to enter a voice instruction "go to Zhongguancun" to the voice assistant. The voice assistant may directly obtain and find an optimal route to Zhongguancun, and the user does not need to enter a voice instruction such as "hi, Allen, go to Zhongguancun" to the voice assistant, thereby facilitating a user operation and improving user experience. The content is also applicable to but is not limited in all embodiments of the present disclosure.

Optionally, the first message received in step 450 may further carry sleep instruction information. The method 400 further includes entering a sleep state according to the sleep instruction information.

In the sleep state, the device is still in a monitoring state, that is, the device may monitor a voice instruction (such as a voice wakeup instruction and/or a voice operation instruction) sent by the user, but not responds to the received voice instruction.

In step 450, when the first message sent by the server according to the information is received, the communication method 400 may further include receiving a second voice instruction, and skip responding to the second voice instruction.

For example, the second voice instruction may be a voice operation instruction.

When the second message sent by the server according to the information is received, the communication method 400 may further include receiving a third voice instruction, sending the third voice instruction to the server, receiving a third message sent by the server according to the third voice instruction, where the third message is used to indicate an operation corresponding to the third voice instruction, and performing, according to the third message, the operation corresponding to the third voice instruction.

For example, the third voice instruction may be a voice operation instruction.

It should be understood that, the device may simultaneously send the obtained information and the received third voice instruction to the server, or may separately send the information and the third voice instruction to the server. No limitation is imposed in this embodiment of the present disclosure.

Therefore, in this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

Figure 5:
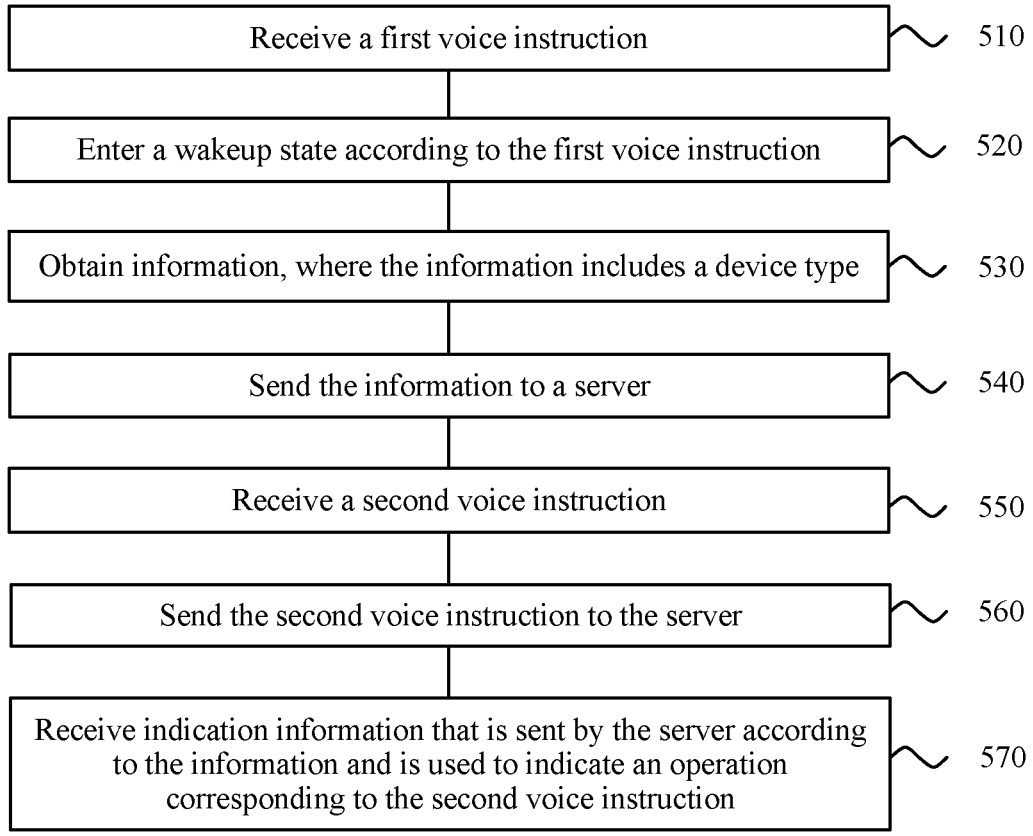
FIG. 5 is a schematic flowchart of a communication method according to another embodiment of the present disclosure.

FIG. 5 is a schematic flowchart of a communication method 500 according to another embodiment of the present disclosure. Multiple devices of one user can simultaneously receive a same voice instruction sent by the user. The communication method 500 may be executed by any device in the multiple devices of one user. Further, the communication method 500 may be executed by a device or a voice assistant of the device. As shown in FIG. 5, the communication method 500 includes the following steps.

Step 510: Receive a first voice instruction.

Step 520: Enter a wakeup state according to the first voice instruction.

Step 530; Obtain information, where the information includes a device type.

Step 540: Send the information to a server.

Step 550: Receive a second voice instruction.

Step 560: Send the second voice instruction to the server.

Step 570: Receive indication information that is sent by the server according to the information and is used to indicate an operation corresponding to the second voice instruction.

The information may further include at least one of a scene mode of the device or a voice instruction.

It should be understood that, sequence numbers of the processes do not mean an execution order. The execution order of the processes should be determined according to functions and internal logic of the processes, and should not be construed as any limitation on the implementation processes of the embodiments of the present disclosure.

For example, step 540 and step 560 may be performed separately, or may be performed simultaneously. That is, the information and the second voice instruction may be separately sent to the server, or the information and the second voice instruction may be simultaneously sent to the server.

In this embodiment of the present disclosure, obtained information and a received voice instruction are sent to a server such that the server can determine, according to the information, a device responding to a voice instruction from multiple devices of one user, and send indication information of an operation corresponding to the voice instruction to the device responding to a voice instruction. For a user having multiple different devices, a device responding to a voice instruction can be intelligently selected, and more convenient and natural man-machine interaction experience is provided for the user.

Figure 6:
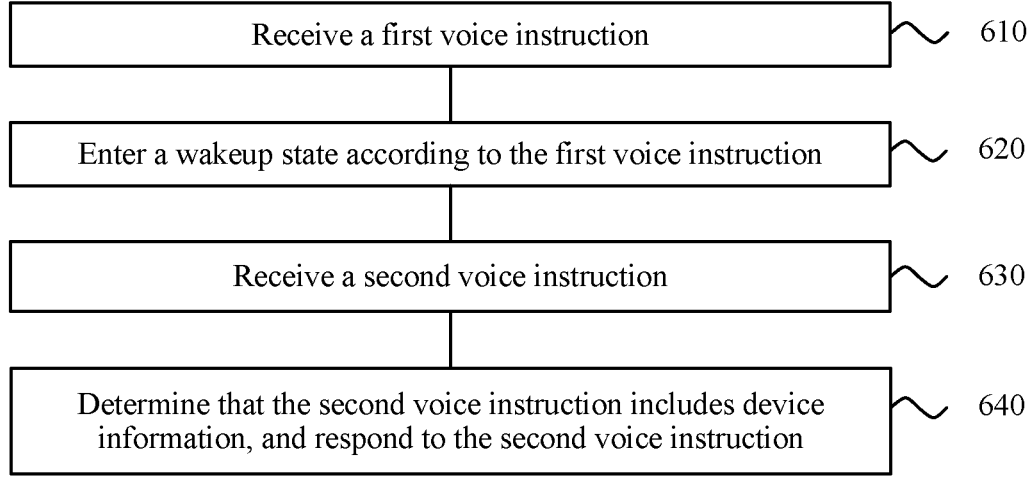
FIG. 6 is a schematic flowchart of a communication method according to another embodiment of the present disclosure.

FIG. 6 is a schematic flowchart of a communication method 600 according to another embodiment of the present disclosure. Multiple devices of one user can simultaneously receive a same voice instruction sent by the user. The communication method 600 may be executed by any device in the multiple devices of one user. Further, the communication method 600 may be executed by a device or a voice assistant of the device. As shown in FIG. 6, the communication method 600 includes the following steps.

Step 610: Receive a first voice instruction.

Step 620: Enter a wakeup state according to the first voice instruction.

Step 630: Receive a second voice instruction.

Step 640: Determine that the second voice instruction includes device information, and respond to the second voice instruction.

It should be understood that, the device information is used to distinguish the multiple devices of one user. The device information may be a device type such as a mobile phone, a band, an in-vehicle device, or a stereo, or may be a device name, or may be a device number, or the like. No limitation is imposed in this embodiment of the present disclosure as long as the multiple devices of one user can be recognized.

For example, a voice operation parsing request is sent to a server, and the voice operation parsing request carries the second voice instruction.

Correspondingly, when the second voice instruction does not include the device information, the device does not respond to the second voice instruction.

It should be understood that, if the device recognizes that the second voice instruction does not include the device information, the device does not send a voice parsing request to the server. For example, the device may discard the second voice instruction. Alternatively, the device may stop processing the second voice instruction.

The device may pre-store the device information. When a voice instruction received by the device includes the device information, the device sends a voice operation parsing request to the server. When a voice instruction received by the device does not include the device information, the device does not respond to the voice instruction. Optionally, when a voice instruction received by the device does not include the device information, the device may send, for example, a device type, to the server in order to request the server to determine a device responding a voice instruction from the multiple devices of the user.

It should be understood that, the first voice instruction may be a voice wakeup instruction, and the second voice instruction may be a voice operation instruction. In this embodiment of the present disclosure, the voice wakeup instruction and the voice operation instruction may be simultaneously received. For example, a voice instruction "hi, Allen, call Zhang San using a mobile phone" sent by the user is received. Alternatively, the voice wakeup instruction and the voice operation instruction may be separately received. For example, a voice wakeup instruction "hi, Allen" sent by the user is first received in order to enter the wakeup state, and a voice operation instruction "call Zhang San using a mobile phone" sent by the user is next received within response duration. No limitation is imposed in this embodiment of the present disclosure.

Therefore, in this embodiment of the present disclosure, when a received voice instruction includes device information, the voice instruction is automatically responded to such that a device responding to a voice instruction can be intelligently selected, and more convenient and natural man-machine interaction experience is provided for a user.

With reference to specific examples in FIG. 7A to FIG. 11, the following describes in detail a communication method according to an embodiment of the present disclosure.

Figure 7A:
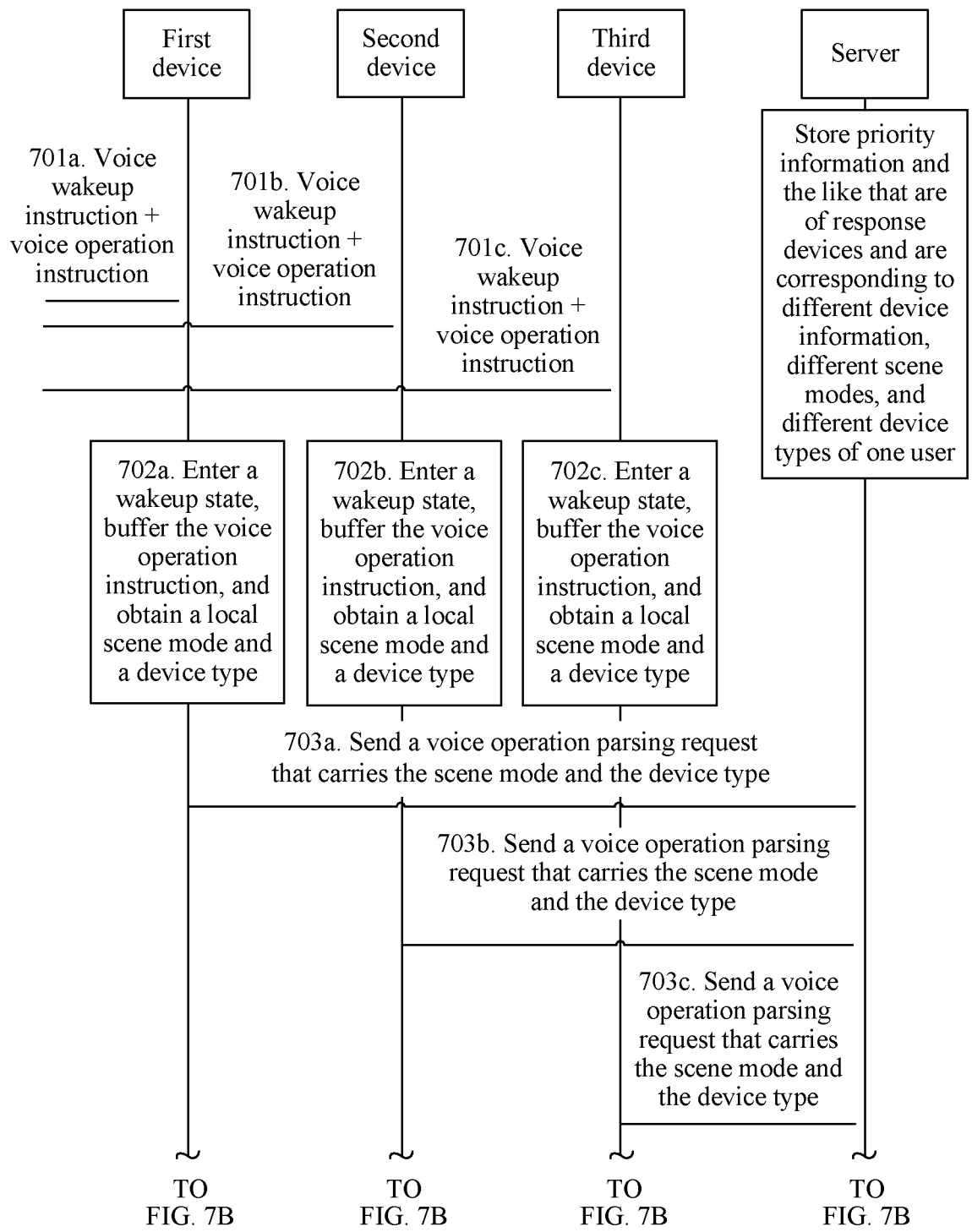
FIG. 7A and FIG. 7B are a schematic flowchart of a communication method according to another embodiment of the present disclosure.
Figure 7B:
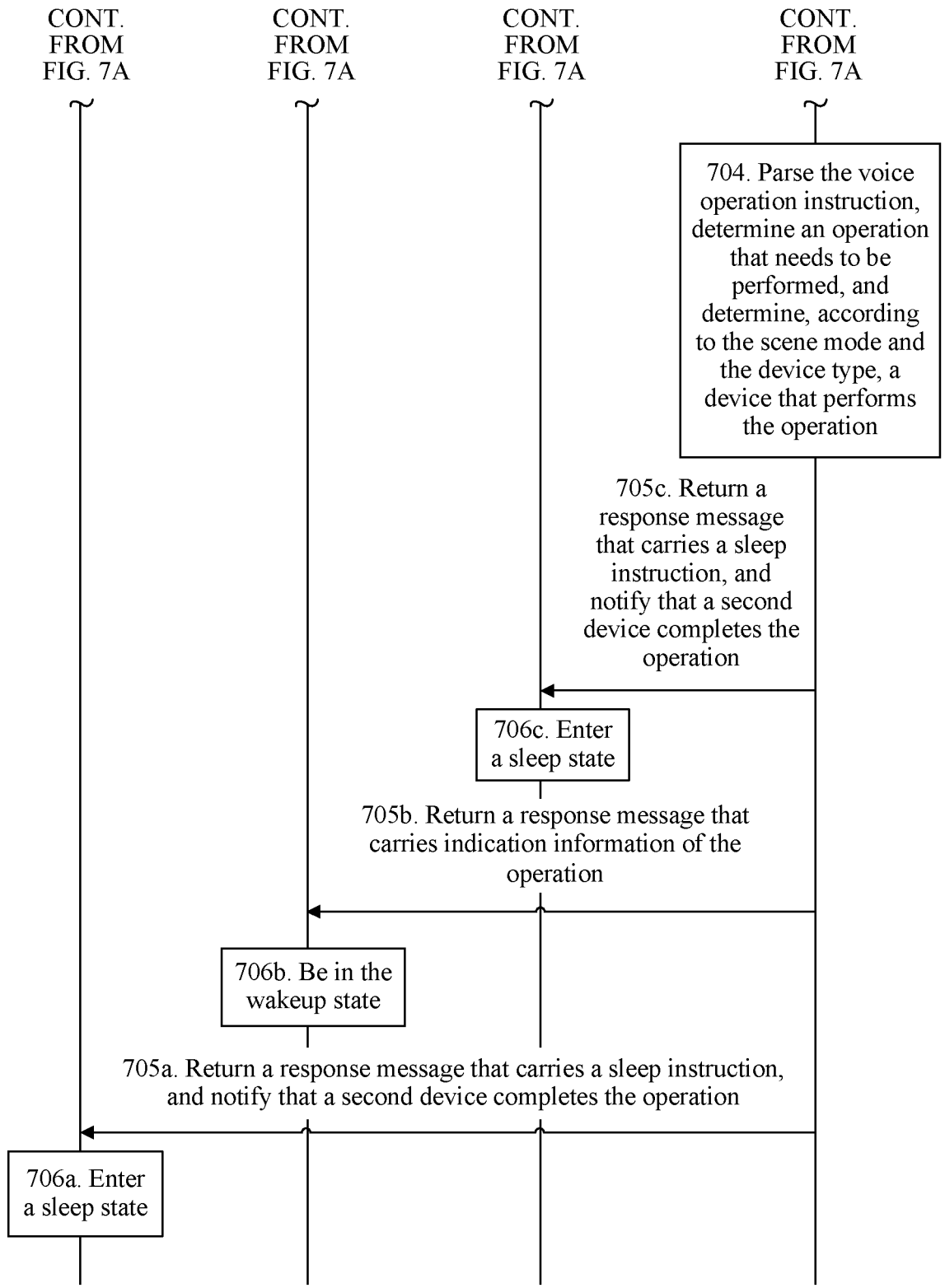

FIG. 7A and FIG. 7B are a schematic flowchart of a communication method according to another embodiment of the present disclosure. As shown in FIG. 7A and FIG. 7B, the communication method includes the following steps.

Steps 701a, 701b, and 701c: Respective voice assistants of a first device, a second device, and a third device simultaneously receive a voice instruction "hi, Allen, open a map," where "hi, Allen" is a voice wakeup instruction, and "open a map" is a voice operation instruction.

Steps 702a, 702b, and 702c: After entering a wakeup state according to the voice wakeup instruction "hi, Allen," the voice assistant of each of the first device, the second device, and the third device buffers the voice operation instruction, and obtains a scene mode of a device to which the voice assistant belongs (i.e., local scene mode) and a device type.

Steps 703a, 703b, and 703c: The voice assistant of each of the first device, the second device, and the third device sends a voice operation parsing request to a server, where the voice operation parsing request carries a current scene mode of the device, the device type, and the voice operation instruction "open a map."

Step 704: The server parses the voice operation instruction, determines that an operation that needs to be performed is "open a map," and determines, with reference to the scene mode and the device type, that a device that currently needs to perform the operation is, for example, the second device.

Step 705a: The server returns, to the voice assistant of the first device, a response message that carries sleep instruction information, and notifies the voice assistant of the first device that the voice assistant of the second device performs the operation "open a map."

Step 705b: The server returns a response message to the voice assistant of the second device, that is, the server returns indication information that is used to indicate the operation "open a map" that needs to be performed.

Step 705c: The server returns, to the voice assistant of the third device, a response message that carries sleep instruction information, and notifies the voice assistant of the third device that the voice assistant of the second device performs the operation "open a map."

Steps 706a and 706c: Both the voice assistant of the first device and the voice assistant of the third device enter a sleep state, where in the sleep state, low-power voice wakeup modules of the first device and the third device are still in a monitoring state.

Step 706b: The voice assistant of the second device is in the wakeup state.

It should be noted that, when a scene mode changes, the voice assistant of the first device and the voice assistant of the third device may be switched from the sleep state to a normal state.

Figure 8A:
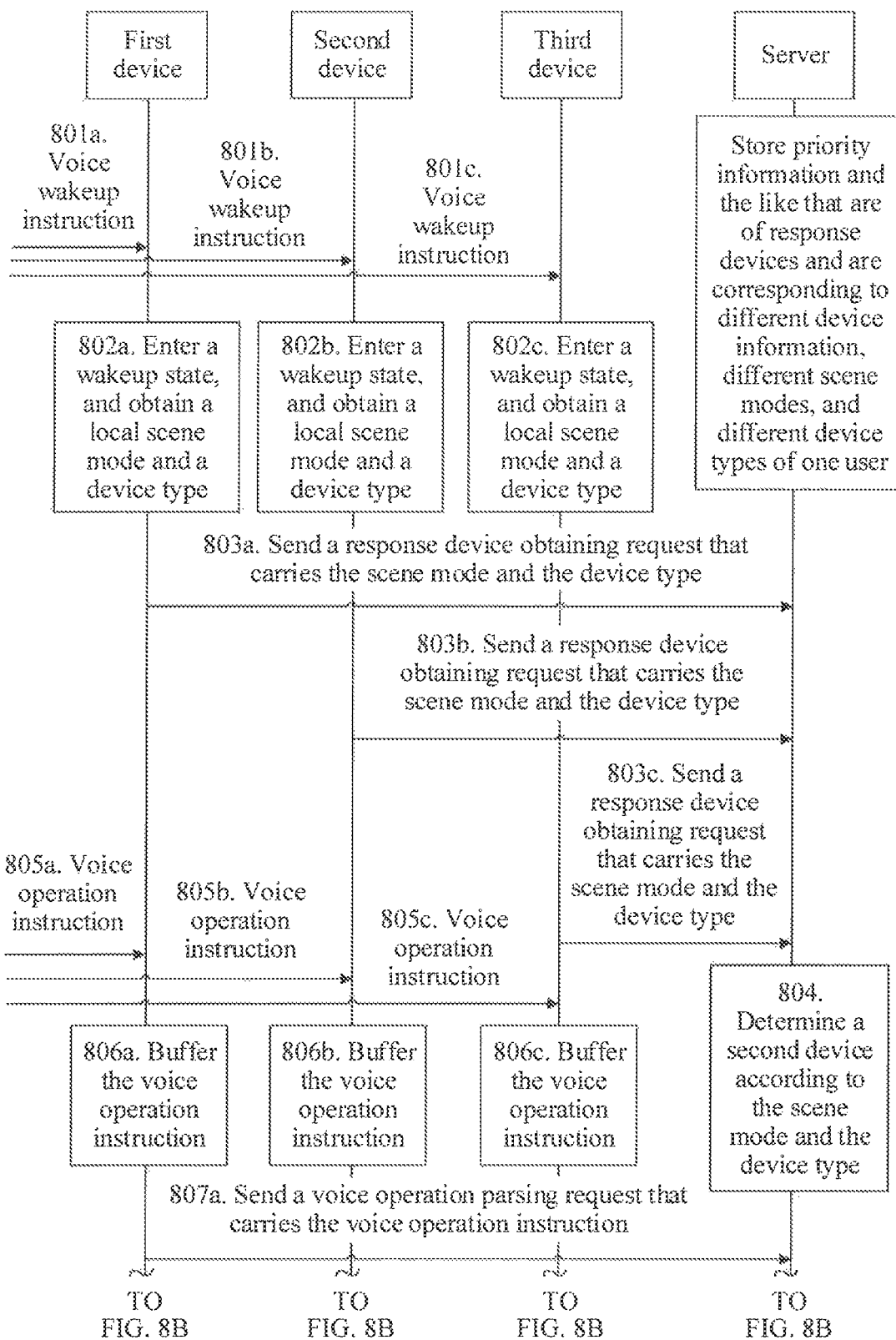
FIG. 8A and FIG. 8B are a schematic flowchart of a communication method according to another embodiment of the present disclosure.
Figure 8B:
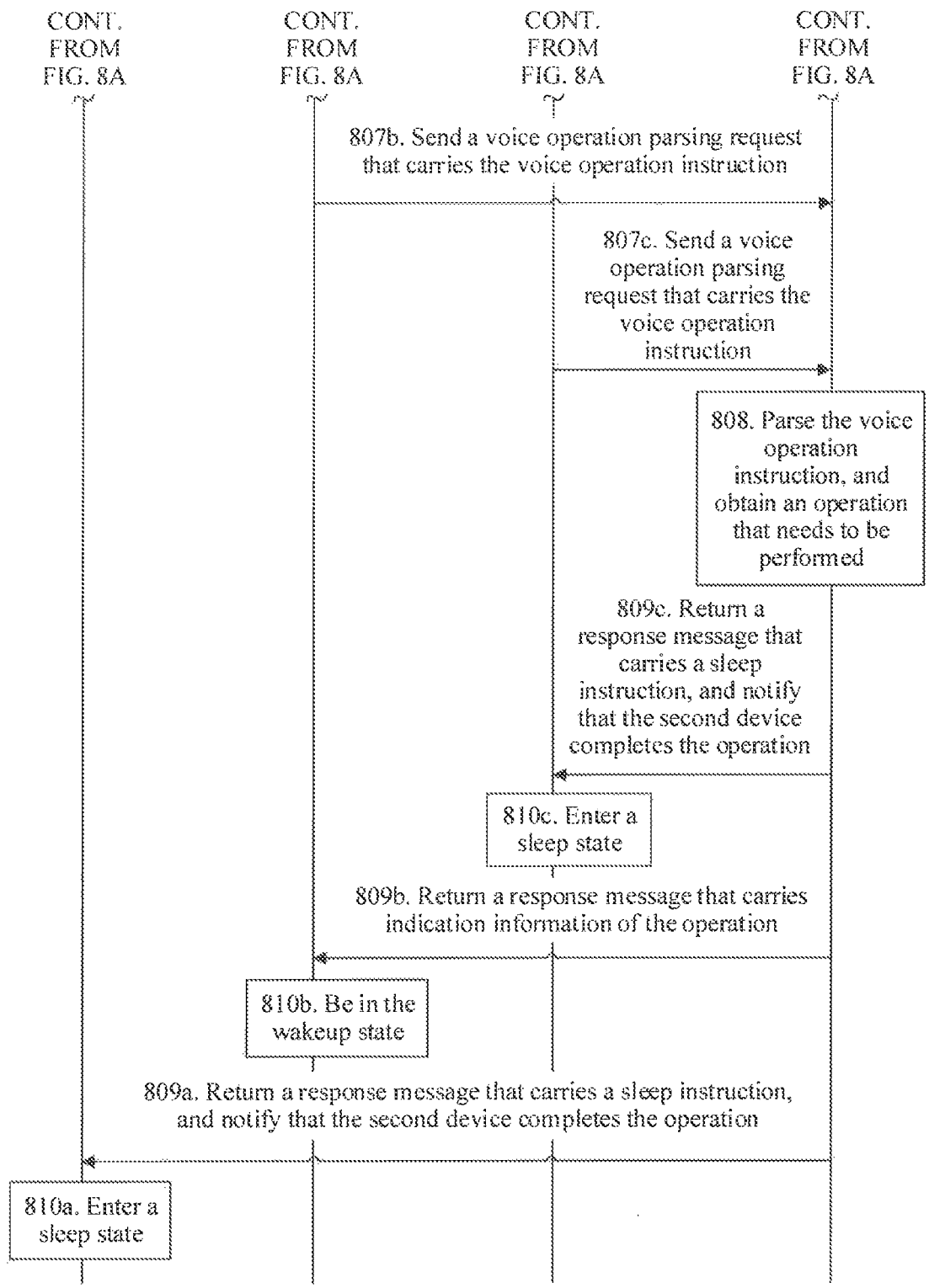

FIG. 8A and FIG. 8B are a schematic flowchart of a communication method according to another embodiment of the present disclosure. As shown in FIG. 8A and FIG. 8B, the communication method includes the following steps.

Steps 801a, 801b, and 801c: Respective voice assistants of a first device, a second device, and a third device simultaneously receive a voice wakeup instruction "hi, Allen."

Steps 802a, 802b, and 802c: After entering a wakeup state according to the voice wakeup instruction "hi, Allen", the voice assistant of each of the first device, the second device, and the third device obtains a local scene mode of a device and a device type from the three devices.

Steps 803a, 803b, and 803c: The voice assistant of each of the first device, the second device, and the third device sends, to a server, a response device obtaining request that carries the scene mode of the device and the device type.

Step 804: The server determines, according to the scene mode and the device type, that a device that currently needs to perform an operation corresponding to a voice operation instruction is, for example, the second device.

Steps 805a, 805b, and 805c: When performing the operation steps, the voice assistant of each of the first device, the second device, and the third device still continues to receive a voice operation instruction.

Steps 806a, 806b, and 806c: The voice assistant of each of the first device, the second device, and the third device buffers a voice operation instruction "open a map."

Steps 807a, 807b, and 807c: The voice assistant of each of the first device, the second device, and the third device sends, to the server, a voice operation parsing request that carries the voice operation instruction "open a map."

Step 808: The server parses the voice operation instruction, and obtains, by means of analysis, that an operation that needs to be performed is "open a map."

Step 809a: The server returns, to the voice assistant of the first device, a response message that carries sleep instruction information, and notifies the voice assistant that the voice assistant of the second device performs the operation "open a map."

Step 809b: The server returns response information to the voice assistant of the second device, that is, the server returns indication information that is used to indicate the operation "open a map" that needs to be performed.

Step 809c: The server returns, to the voice assistant of the third device, a response message that carries sleep instruction information, and notifies the voice assistant that the voice assistant of the second device performs the operation "open a map."

Steps 810a and 810c: Both the voice assistant of the first device and the voice assistant of the third device enter a sleep state, where in the sleep state, low-power voice wakeup modules of the first device and the third device are still in a monitoring state.

Step 810b: The voice assistant of the second device is in the wakeup state.

In addition, when a scene mode changes, the voice assistant of the first device and the voice assistant of the third device may be switched from the sleep state to a normal state.

It should be noted that in this embodiment of the present disclosure, step 803 (i.e., steps 803a, 803b, and 803c) and step 804 may be performed at the same time as step 805 (i.e., steps 805a, 805b, and 805c), step 806 (i.e., steps 806a, 806b, and 806c), and step 807 (i.e., steps 807a, 807b, and 807c), and there is no time sequence.

Figure 9A:
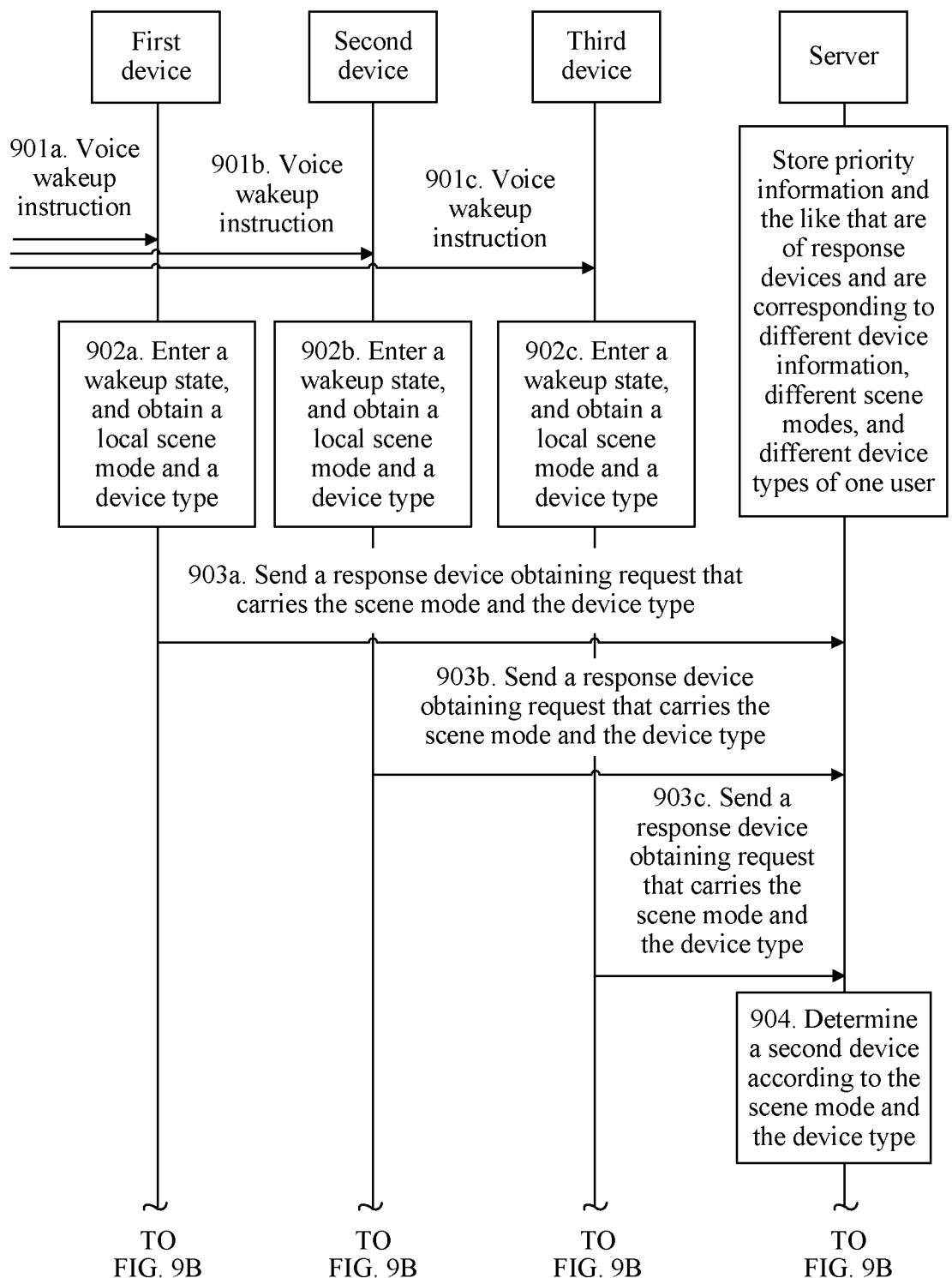
FIG. 9A and FIG. 9B are a schematic flowchart of a communication method according to another embodiment of the present disclosure.
Figure 9B:
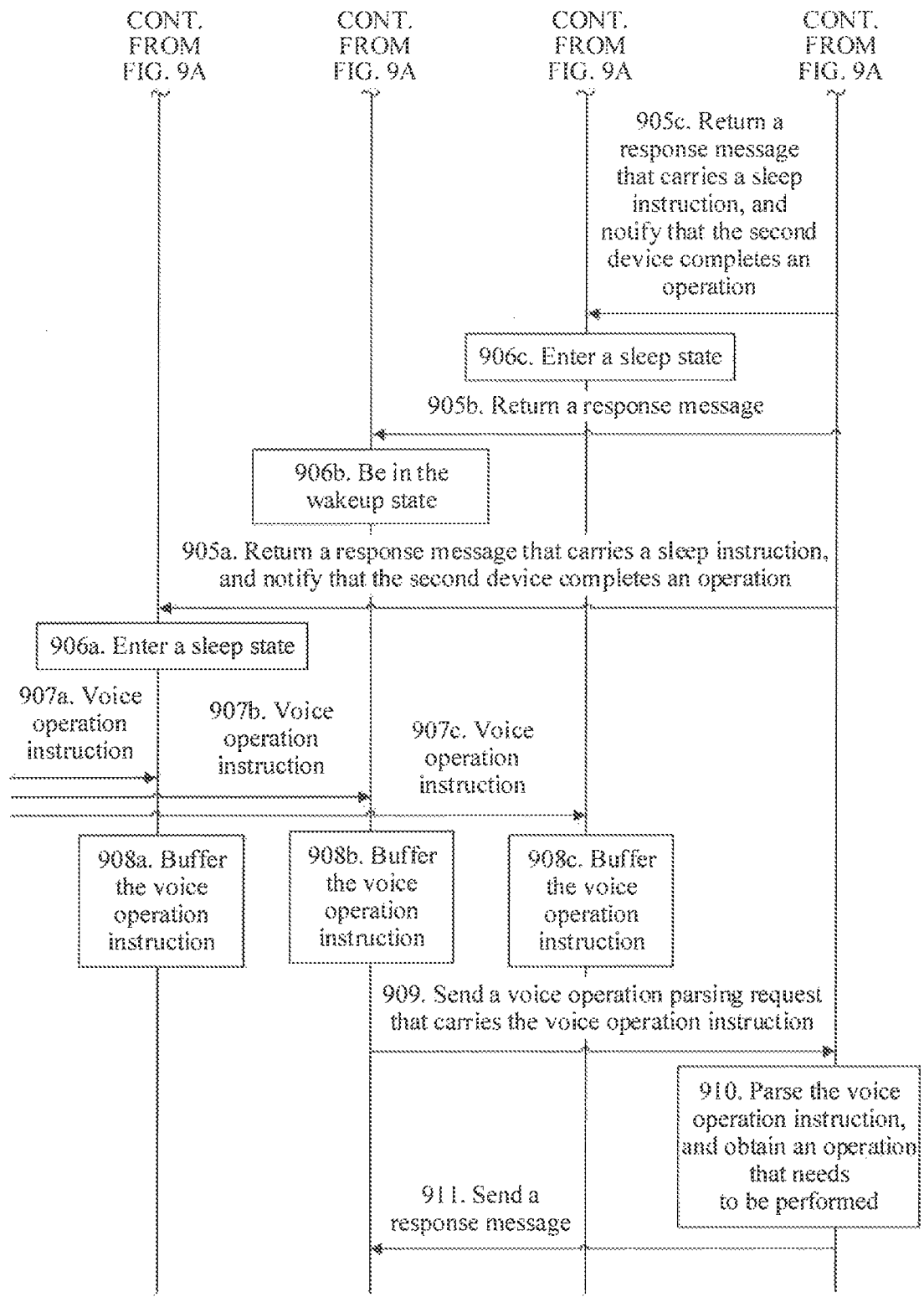

FIG. 9A and FIG. 9B are a schematic flowchart of a communication method according to another embodiment of the present disclosure. As shown in FIG. 9A and FIG. 9B, the communication method includes the following steps.

Steps 901a, 901b, and 901c: Respective voice assistants of a first device, a second device, and a third device simultaneously receive a voice wakeup instruction "hi, Allen."

Steps 902a, 902b, and 902c: After entering a wakeup state according to the voice wakeup instruction "hi, Allen," the voice assistant of each of the first device, the second device, and the third device obtains a scene mode of a device to which the voice assistant belongs (i.e., local scene mode) and a device type.

Steps 903a, 903b, and 903c: The voice assistant of each of the first device, the second device, and the third device sends, to a server, a response device obtaining request that carries the scene mode and the device type.

Step 904: The server determines, according to the scene mode and the device type, that a device that currently needs to perform an operation is, for example, the second device.

Step 905a: The server returns, to the voice assistant of the first device, a response message that carries sleep instruction information, and notifies the voice assistant of the first device that the voice assistant of the second device performs an operation.

Step 905b: The server returns response information to the voice assistant of the second device, that is, the server notifies that a device responding to a voice instruction is the second device.

Step 905c: The server returns, to the voice assistant of the third device, a response message that carries sleep instruction information, and notifies the voice assistant of the third device that the voice assistant of the second device performs an operation.

Steps 906a and 906c: Both the voice assistant of the first device and the voice assistant of the third device enter a sleep state, where in the sleep state, low-power voice wakeup modules of the first device and the third device are still in a monitoring state.

Step 906b: The voice assistant of the second device is in the wakeup state.

Steps 907a, 907b, and 907c: When performing the operation steps, the voice assistant of each of the first device, the second device, and the third device still continues to receive a voice operation instruction.

Steps 908a, 908b, and 908c: The voice assistant of each of the first device, the second device, and the third device buffers a voice operation instruction "open a map."

Step 909: The voice assistant of the second device sends, to the server, a voice operation parsing request that carries the voice operation instruction "open a map."

Step 910: The server parses the voice operation instruction, and obtains, by means of analysis, that an operation that needs to be performed is "open a map."

Step 911: The server returns response information to the voice assistant of the second device, that is, the server returns indication information that is used to indicate the operation "open a map" that needs to be performed.

After receiving the response message, the voice assistant of the second device performs the operation "open a map" according to the indication information.

Similarly, when a scene mode changes, the voice assistant of the first device and the voice assistant of the third device may be switched from the sleep state to a normal state.

For example, for the steps, there is no time sequence between performing step 907 (i.e., steps 907a, 907b, and 907c) and step 908 (i.e., steps 908a, 908b, and 908c) and performing step 903 (i.e., steps 903a, 903b, and 903c), step 904, step 905 (i.e., steps 905a, 905b, and 905c), and step 906 (i.e., steps 906a, 906b, and 906c).

Figure 10A:
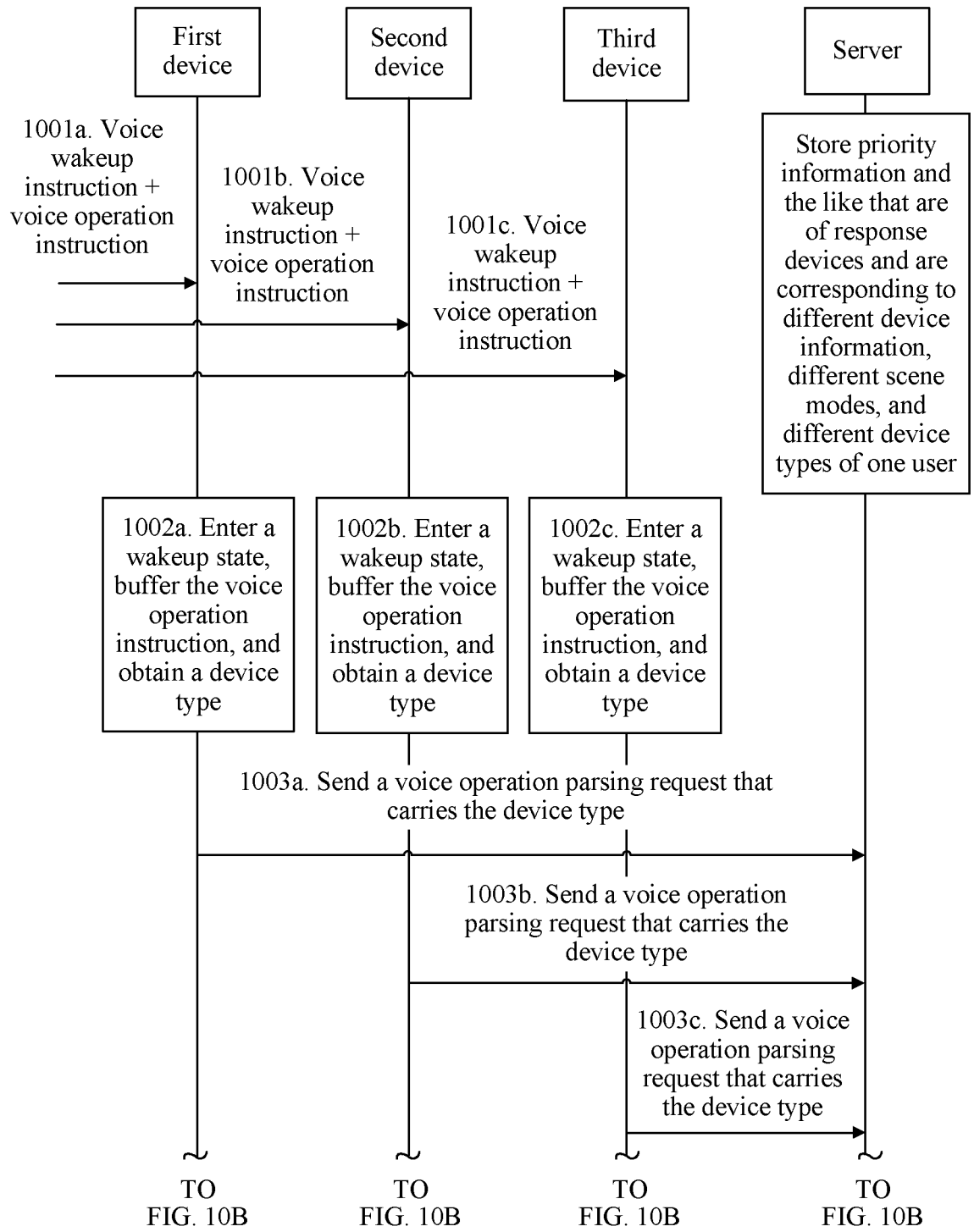
FIG. 10A and FIG. 10B are a schematic flowchart of a communication method according to another embodiment of the present disclosure.
Figure 10B:
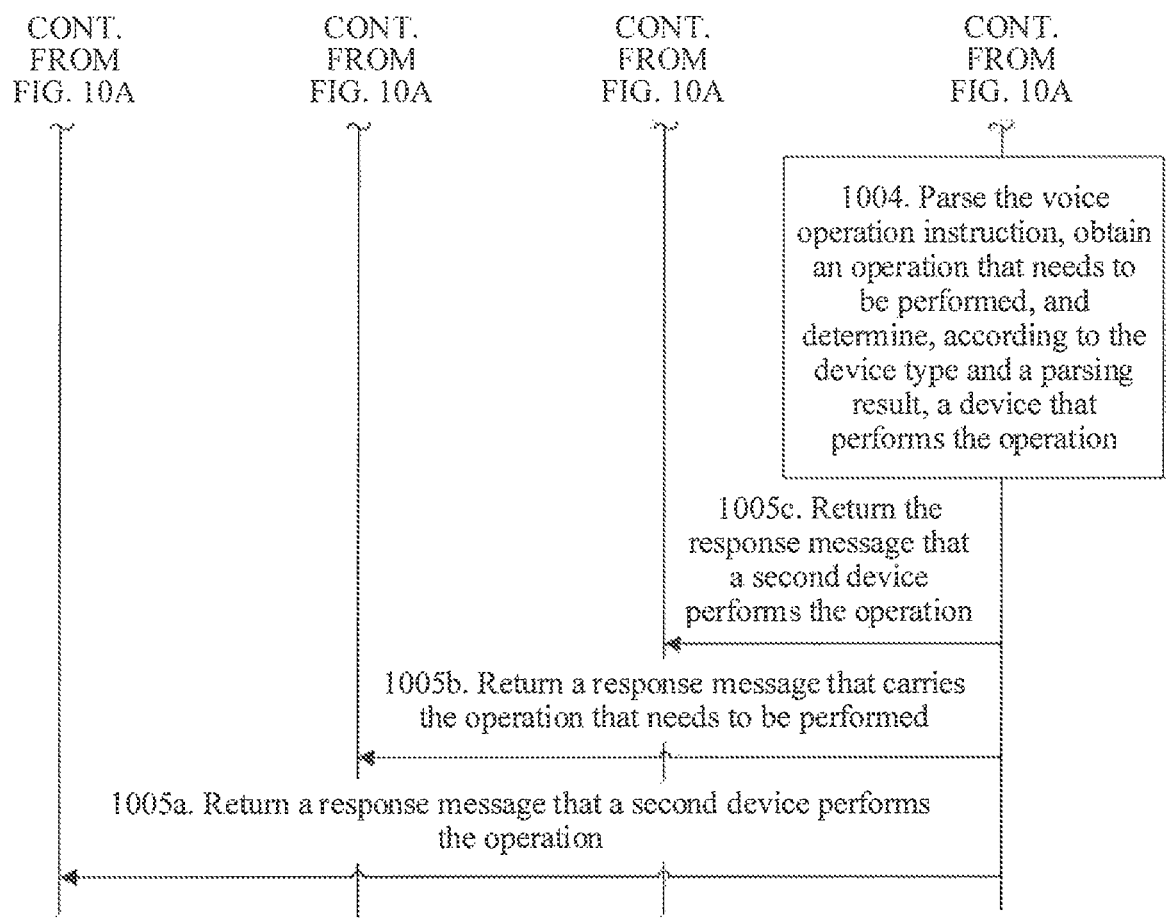

FIG. 10A and FIG. 10B are a schematic flowchart of a communication method according to another embodiment of the present disclosure. As shown in FIG. 10A and FIG. 10B, the communication method includes the following steps.

Steps 1001a, 1001b, and 1001c: Respective voice assistants of a first device, a second device, and a third device simultaneously receive a voice instruction "hi, Allen, open a map," where "hi, Allen" is a voice wakeup instruction, and "open a map" is a voice operation instruction.

Steps 1002a, 1002b, and 1002c: The voice assistant of each of the first device, the second device, and the third device enters a wakeup state according to the voice wakeup instruction "hi, Allen," and after entering the wakeup state, the voice assistant buffers the voice operation instruction, and obtains a device type from a device to which the voice assistant belongs.

Steps 1003a, 1003b, and 1003c: The voice assistant of each of the first device, the second device, and the third device sends a voice operation parsing request to a server, where the voice operation parsing request includes the device type and a voice request instruction "open a map."

Step 1004: The server parses the voice operation instruction "open a map" to obtain an operation that currently needs to be performed and semantic meaning of "open a map,", determines, according to the device type carried in the voice parsing request, that current devices include an in-vehicle device, such as the second device, and determines, according to the semantic meaning and the device type, that a current device responding to a voice instruction is the second device.

Step 1005a: The server returns, to the voice assistant of the first device, a response message that the voice assistant of the second device performs the operation.

Step 1005b: The server returns a response message to the second voice assistant, where the response message carries indication information that is used to indicate the operation.

Step 1005c: The server returns, to the third voice assistant, a response message that the voice assistant of the second device performs the operation.

Figure 11:
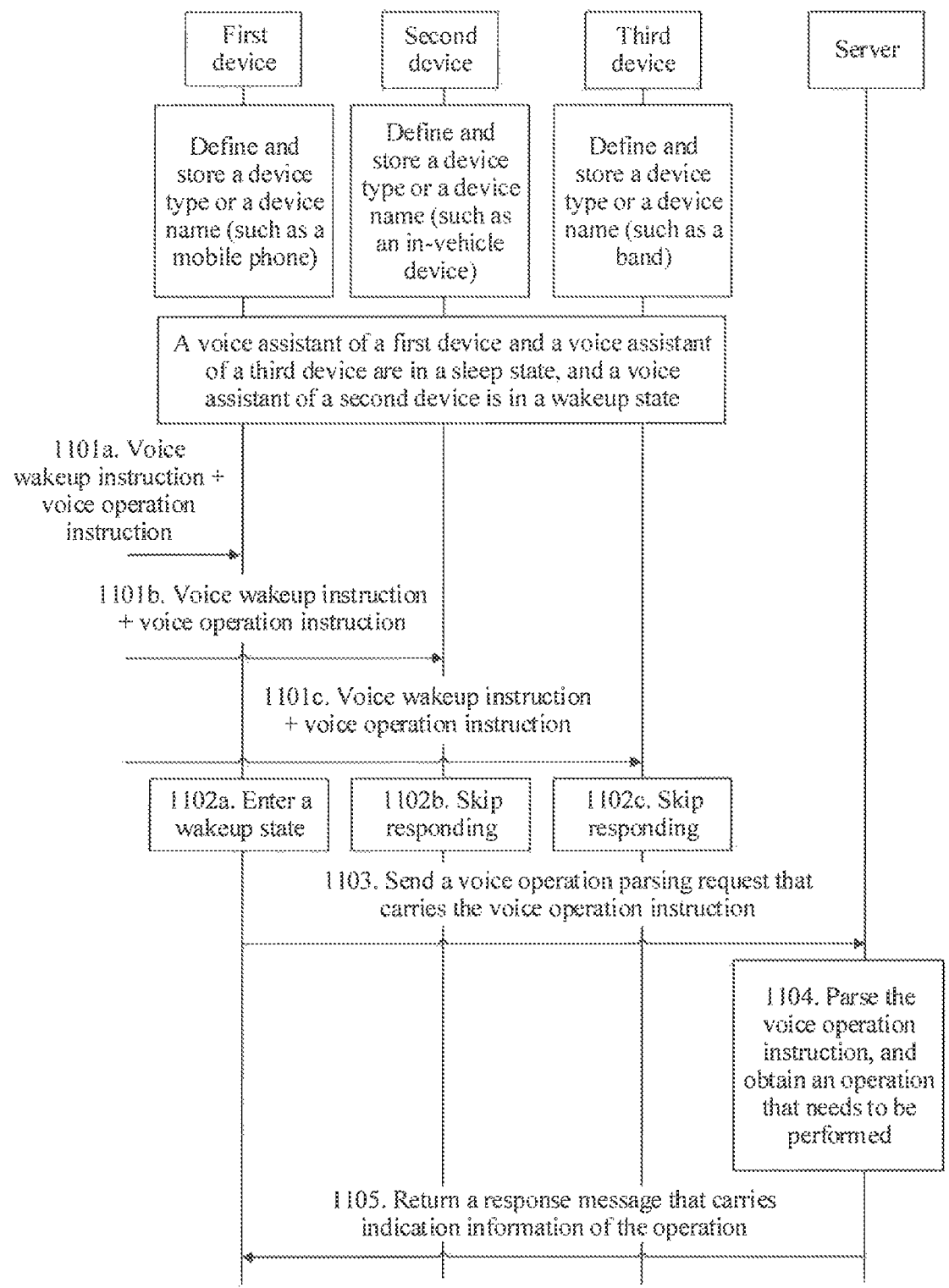
FIG. 11 is a schematic flowchart of a communication method according to another embodiment of the present disclosure.

FIG. 11 is a schematic flowchart of a communication method according to another embodiment of the present disclosure. As shown in FIG. 11, the communication method includes the following content.

Steps 1101a, 1101b, and 1101c: Respective voice assistants of a first device, a second device, and a third device simultaneously receive a voice instruction "hi, Allen, call Zhang San using a mobile phone."

Before this step 1101 (i.e., steps 1101a, 1101b, and 1101c), a device type, a device name or both is defined and stored in the first device, the second device, and the third device of one user. For example, the device type is a mobile phone, an in-vehicle device, or a band.

In addition, before step 1101, the voice assistant of the first device and the voice assistant of the third device are in a sleep state (in this state, a low-power wakeup module is still in an active state), and the voice assistant of the second device is in a wakeup state.

In step 1101, the voice instruction may further be "hi, Allen, start navigation using an in-vehicle device," or "hi, Allen, turn on TV," or "hi, Allen, send an SMS message 'I have arrived' to Li Si using a band," or the like.

Step 1102a: The voice assistant of the first device enters a wakeup state from a sleep state according to a voice wakeup instruction "hi, Allen," and determines that a voice operation instruction includes information about the first device, such as "mobile phone."

Step 1102b: The voice assistant of the second device continues to remain in a wakeup state according to the voice wakeup instruction "hi, Allen," determines that the voice operation instruction does not include local information, such as "in-vehicle device," and does not respond to the voice operation instruction.

Step 1102c: The voice assistant of the third device enters a wakeup state from a sleep state according to the voice wakeup instruction "hi, Allen," determines that the voice operation instruction does not include information about the third device, such as "band," and does not respond to the voice operation instruction.

Step 1103: The voice assistant of the first device sends, to a server, a voice parsing request that carries the voice operation instruction "call Zhang San."

Step 1104: The server parses the voice operation instruction, and obtains, by means of analysis, that an operation that needs to be performed is "make a call," and a callee is "Zhang San."

Step 1105: The server returns a response message to the voice assistant of the first device, where the response message carries indication information that is used to indicate the operation.

After receiving the response message, the voice assistant of the first device searches for a phone number of Zhang San and calls Zhang San, according to the indication information.

Figure 12A:
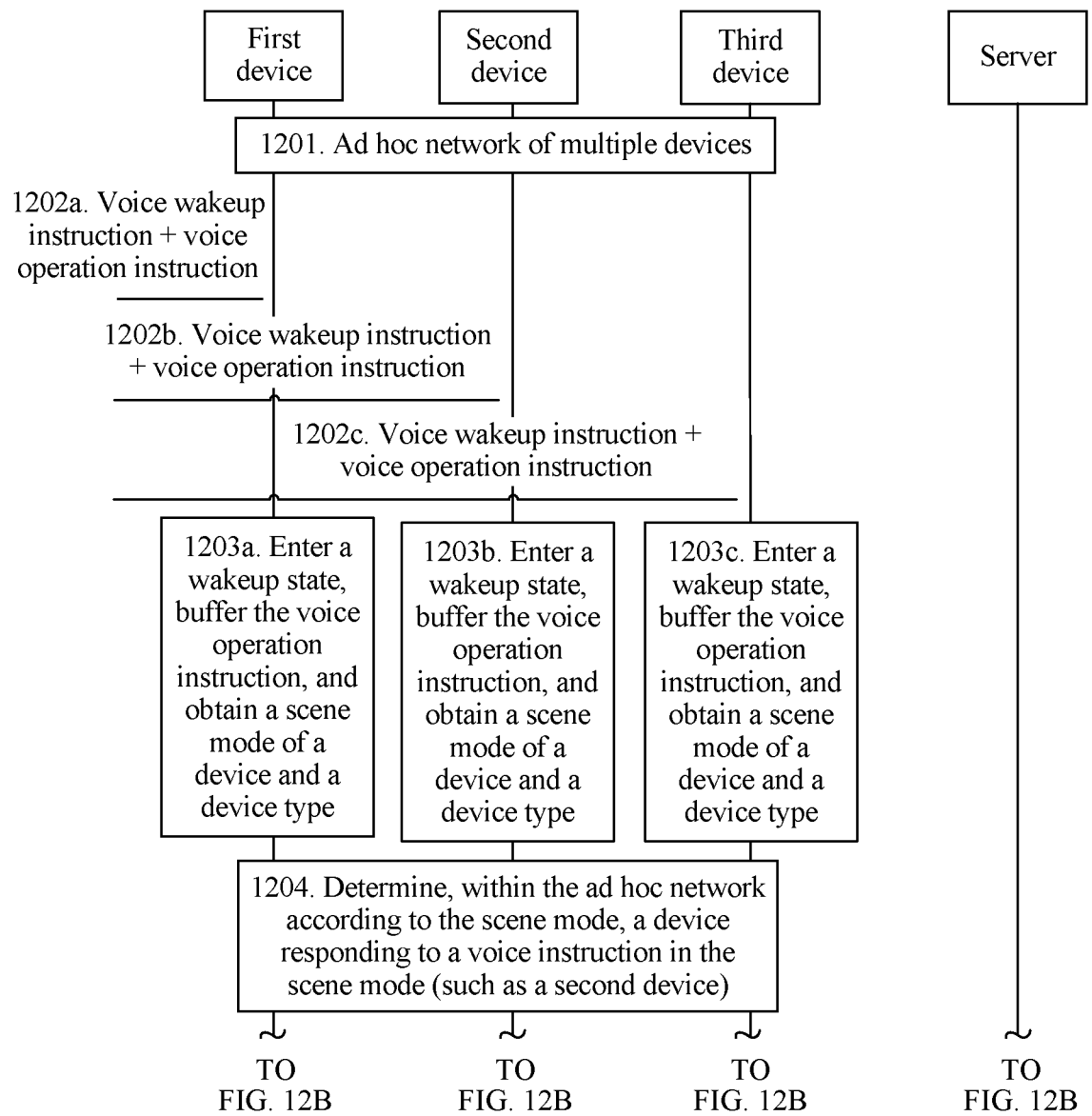
FIG. 12A and FIG. 12B are a schematic flowchart of a communication method according to another embodiment of the present disclosure.
Figure 12B:
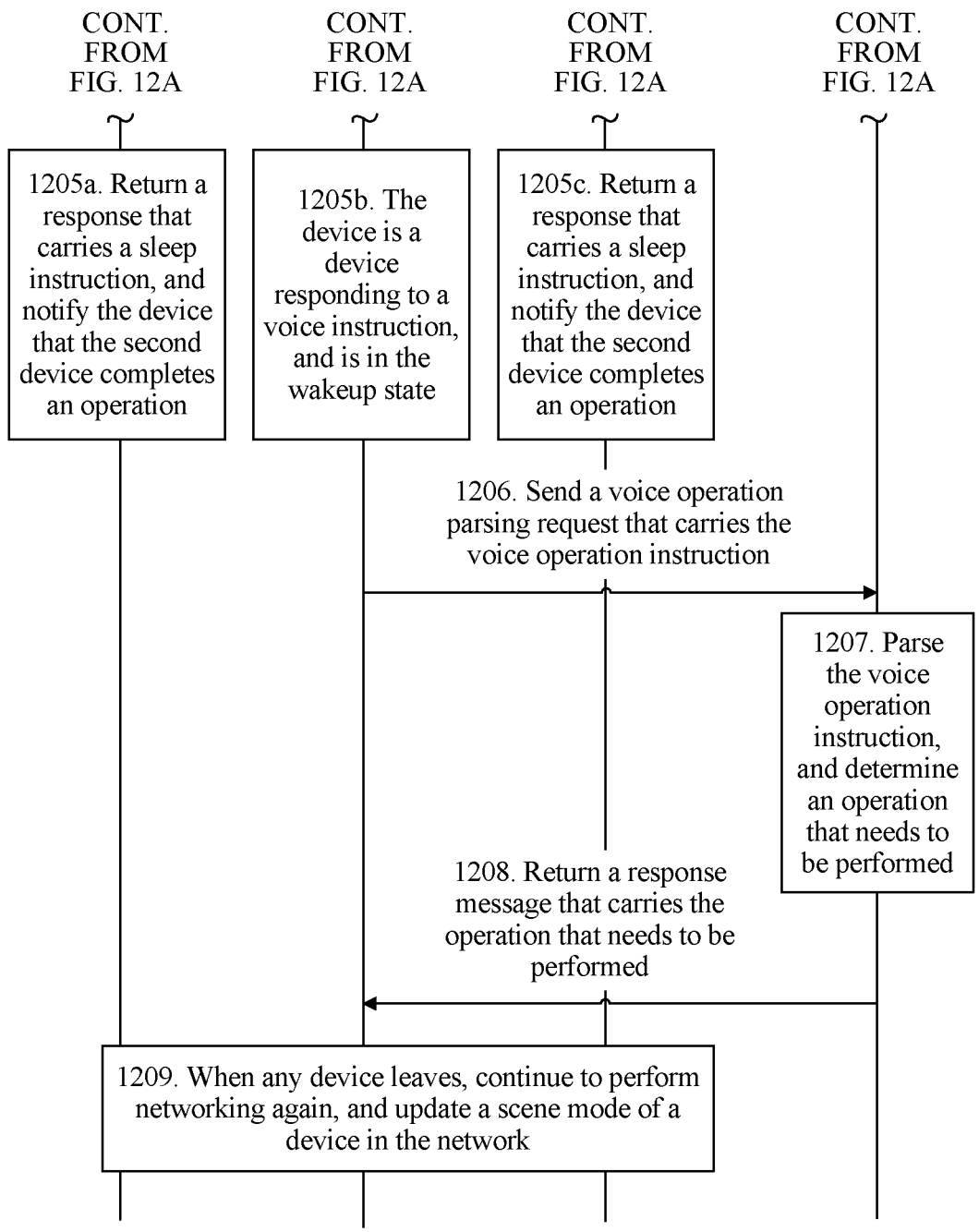

FIG. 12A and FIG. 12B are a schematic flowchart of a communication method according to another embodiment of the present disclosure. As shown in FIG. 12A and FIG. 12B, the communication method includes the following content.

Step 1201: A first device, a second device, and a third device implement an ad hoc network.

Steps 1202a, 1202b, and 1202c: Respective voice assistants of the first device, the second device, and the third device receive a voice instruction "hi, Allen, open a map," where "hi, Allen" is a voice wakeup instruction, and "open a map" is a voice operation instruction.

Steps 1203a, 1203b, and 1203c: The voice assistant of each of the first device, the second device, and the third device enters a wakeup state according to the voice wakeup instruction "hi, Allen," and the voice assistant buffers the voice operation instruction, and obtains a scene mode of a device to which the voice assistant belongs and a device type from the device.

Step 1204: A controller in the ad hoc network determines, according to the scene mode and the device type, a device responding to a voice instruction in the scene mode, such as the second device.

Step 1205a: The voice assistant of the first device receives a response message that carries sleep instruction information, and the voice assistant is notified that the second device completes an operation corresponding to the voice operation instruction.

Step 1205b: The second device is the device responding to a voice instruction such that the voice assistant of the second device is in the wakeup state.

Step 1205c: The voice assistant of the third device receives a response message that carries sleep instruction information, and the voice assistant is notified that the voice assistant of the second device completes the operation corresponding to the voice operation instruction.

Step 1206: The voice assistant of the second device sends, to a server, a voice operation parsing request that carries the voice operation instruction "open a map."

Step 1207: The server parses the voice operation instruction "open a map," and determines that an operation that needs to be performed by the voice assistant of the second device is "open a map."

Step 1208: The server returns a response message to the voice assistant of the second device, where the response message carries indication information that is used to indicate the operation "open a map."

It should be noted that, after any device in the ad hoc network leaves, remaining devices may continue to perform networking again, and update a scene mode of the device in the ad hoc network.

With reference to FIG. 1 to FIG. 12B, the foregoing describes in detail the communication method according to embodiments of the present disclosure. With reference to FIG. 13 to FIG. 18, the following describes in detail a server and a device according to the embodiments of the present disclosure.

Figure 13:
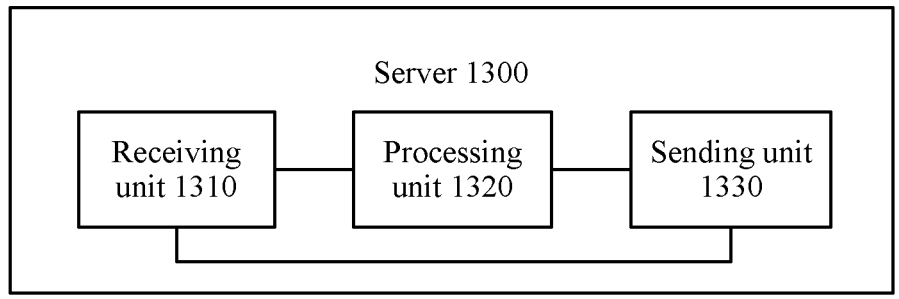
FIG. 13 is a schematic block diagram of a server according to an embodiment of the present disclosure.

FIG. 13 is a schematic block diagram of a server 1300 according to an embodiment of the present disclosure. The server 1300 communicates with multiple devices of one user, and the multiple devices can simultaneously receive a same voice operation instruction sent by the user. As shown in FIG. 13, the server 1300 includes a receiving unit 1310 configured to receive information sent by each device in multiple devices of one user, where the information includes a device type, a processing unit 1320 configured to determine, according to the information received by the receiving unit 1310, a device responding to a voice instruction from the multiple devices, and a sending unit 1330 configured to send a message to a device different from the device responding to a voice instruction in the multiple devices, where the message is used to instruct a voice assistant of the different device not to respond to the voice instruction.

In this embodiment of the present disclosure, information sent by multiple devices of one user is received, and a device responding to a voice instruction is determined from the multiple devices according to the information. For a user having multiple different devices, a device responding to a voice instruction can be intelligently selected, and more convenient and natural man-machine interaction experience is provided for the user.

Optionally, the information sent by each device may further include at least one of a scene mode of a device or a voice instruction.

When the information sent by each device includes a device type and a voice instruction, the processing unit 1320 is further configured to recognize semantic meaning of the voice instruction, and determine, according to the device type and the semantic meaning of the voice instruction, the device responding to a voice instruction from the multiple devices.

Optionally, in another embodiment, when the information sent by each device includes a device type and a voice instruction, the processing unit 1320 is further configured to determine an operation corresponding to the voice instruction. Correspondingly, the sending unit 1330 is configured to send, to the device responding to a voice instruction, indication information that is used to indicate the operation.

Optionally, the message sent to the different device may further carry sleep instruction information.

Optionally, a controller may be any device in the multiple devices.

It should be understood that, the server 1300 may be corresponding to a server in the communication method 200. In addition, the foregoing and other operations and/or functions of all modules/units of the server 1300 are separately used to implement corresponding procedures of the communication method 200 in FIG. 2. For brevity, details are not described herein again.

In this embodiment of the present disclosure, information sent by multiple devices of one user is received, and a device preferentially responding to a voice instruction is determined from the multiple devices according to the information. For a user having multiple different devices, a device responding to a voice instruction can be intelligently selected, and more convenient and natural man-machine interaction experience is provided for the user.

Figure 14:
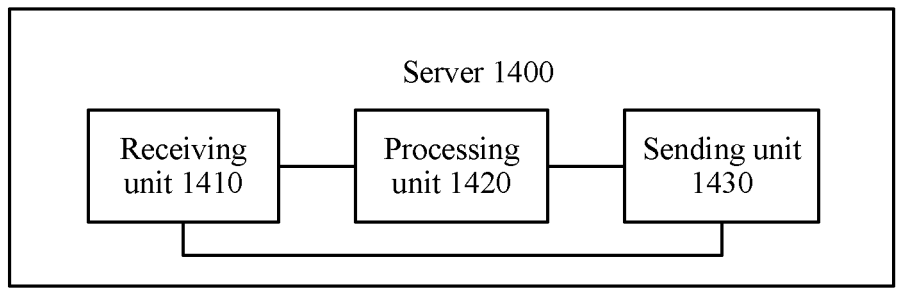
FIG. 14 is a schematic block diagram of a server according to another embodiment of the present disclosure.

FIG. 14 is a schematic block diagram of a server 1400 according to an embodiment of the present disclosure. The server 1400 communicates with multiple devices of one user, and the multiple devices can simultaneously receive a same voice operation instruction sent by the user. As shown in FIG. 14, the server 1400 includes a receiving unit 1410 configured to receive a same voice instruction sent by each device in multiple devices of one user, a processing unit 1420 configured to determine an operation corresponding to the voice instruction received by the receiving unit 1410, and a sending unit 1430 configured to send, to a device responding to a voice instruction, indication information that is used to indicate the operation, where the device responding to a voice instruction is determined according to information sent by each device in the multiple devices, and the information includes a device type.

Optionally, the information may further include at least one of a scene mode of a device or a voice instruction.

It should be understood that in this embodiment of the present disclosure, for a method in which the server 1400 determines, according to the information sent by each device in the multiple devices, the device responding to a voice instruction, reference may be made to related description of the server 1300. To avoid repetition, details are not described herein again.

It should also be understood that, the server 1400 may be corresponding to a server in the communication method 300. In addition, the foregoing and other operations and/or functions of all modules/units of the server 1400 are separately used to implement corresponding procedures of the communication method 300 in FIG. 3. For brevity, details are not described herein again.

In this embodiment of the present disclosure, indication information of an operation is automatically sent to a device responding to a voice instruction. For a user having multiple different devices, a device responding to a voice instruction can be intelligently selected, and more convenient and natural man-machine interaction experience is provided for the user.

Figure 15:
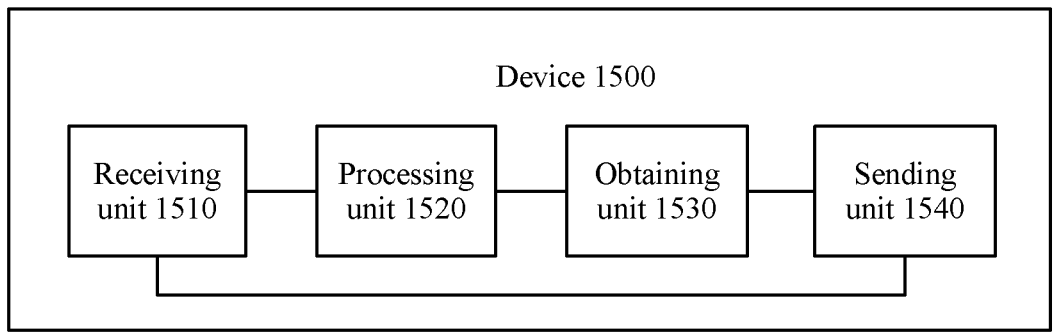
FIG. 15 is a schematic block diagram of a device according to an embodiment of the present disclosure.

FIG. 15 is a schematic block diagram of a device 1500 according to an embodiment of the present disclosure. Multiple devices of one user can simultaneously receive a same voice wakeup instruction or voice operation instruction that is sent by the user, and the device 1500 may be any device in the multiple devices. As shown in FIG. 15, the device 1500 includes a receiving unit 1510 configured to receive a first voice instruction, a processing unit 1520 configured to enter a wakeup state according to the first voice instruction received by the receiving unit 1510, an obtaining unit 1530 configured to obtain information, where the information includes a device type, and a sending unit 1540 configured to send the information to a server.

The receiving unit 1510 is further configured to receive a first message sent by the server according to the information, where the first message is used to instruct a voice assistant of the device 1500 not to respond to a voice instruction, or receive a second message sent by the server according to the information, where the second message is used to instruct a voice assistant of the device 1500 to respond to a voice instruction.

In this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

Optionally, the information further includes at least one of a scene mode of the device 1500 or a voice instruction.

Correspondingly, the receiving unit 1510 may be further configured to receive indication information that is sent by the server and is used to indicate an operation corresponding to a voice instruction, where the information further includes the voice instruction.

Optionally, the first message may further carry sleep instruction information, and the processing unit 1520 may be further configured to enter a sleep state according to the sleep instruction information.

Optionally, when the receiving unit 1510 receives the first message, the receiving unit 1510 is further configured to receive a second voice instruction. The processing unit 1520 is further configured to skip responding to the second voice instruction received by the receiving unit 1510.

Optionally, when the receiving unit 1510 receives the second message, the receiving unit 1510 is further configured to receive a third voice instruction. The sending unit 1540 is further configured to send, to the server, the third voice instruction received by the receiving unit 1510. The receiving unit 1510 is further configured to receive a third message sent by the server according to the third voice instruction, where the third message is used to indicate an operation corresponding to the third voice instruction. The processing unit 1520 is further configured to perform, according to the third message, the operation corresponding to the third voice instruction.

It should be understood that, the device 1500 may be corresponding to a device in the communication method 400. In addition, the foregoing and other operations and/or functions of all modules/units of the device 1500 are separately used to implement corresponding procedures of the communication method 400 in FIG. 4. For brevity, details are not described herein again.

In this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

Figure 16:
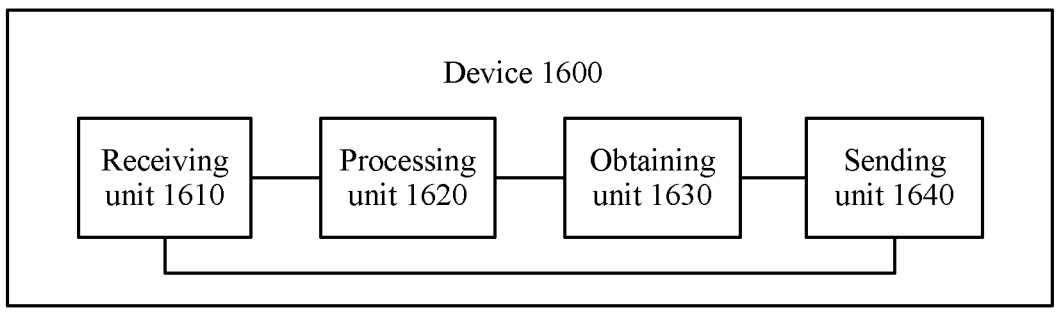
FIG. 16 is a schematic block diagram of a device according to another embodiment of the present disclosure.

FIG. 16 is a schematic block diagram of a device 1600 according to an embodiment of the present disclosure. Multiple devices of one user can simultaneously receive a same voice wakeup instruction or voice operation instruction that is sent by the user, and the device 1600 may be any device in the multiple devices. As shown in FIG. 16, the device 1600 includes a receiving unit 1610, a processing unit 1620, an obtaining unit 1630, and a sending unit 1640.

The receiving unit 1610 is configured to receive a first voice instruction.

The processing unit 1620 is configured to enter a wakeup state according to the first voice instruction.

The obtaining unit 1630 is configured to obtain information, where the information includes a device type.

The sending unit 1640 is configured to send the information to a server.

The receiving unit 1610 is further configured to receive a second voice instruction.

The sending unit 1640 is further configured to send the second voice instruction to the server.

The receiving unit 1610 is further configured to receive indication information that is sent by the server according to the information and is used to indicate an operation corresponding to the second voice instruction.

The information may further include at least one of a scene mode of the device or a voice instruction.

It should be understood that, the device 1600 may be corresponding to a device in the communication method 500. In addition, the foregoing and other operations and/or functions of all modules/units of the device 1600 are separately used to implement corresponding procedures of the communication method 500 in FIG. 5. For brevity, details are not described herein again.

In this embodiment of the present disclosure, obtained information and a received voice instruction are sent to a server such that the server can determine, according to the information, a device responding to a voice instruction from multiple devices of one user, and send indication information of an operation corresponding to the voice instruction to the device responding to a voice instruction. For a user having multiple different devices, a device responding to a voice instruction can be intelligently selected, and more convenient and natural man-machine interaction experience is provided for the user.

Figure 17:
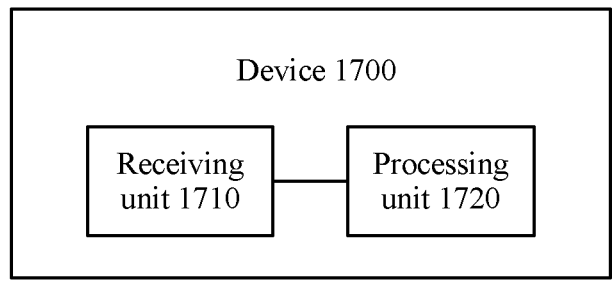
FIG. 17 is a schematic block diagram of a device according to another embodiment of the present disclosure.

FIG. 17 is a schematic block diagram of another device 1700 according to an embodiment of the present disclosure. Multiple devices of one user can simultaneously receive a same voice instruction sent by the user, and the device 1700 may be any device in the multiple devices. As shown in FIG. 17, the device 1700 includes a receiving unit 1710 configured to receive a first voice instruction, and a processing unit 1720 configured to enter a wakeup state according to the first voice instruction received by the receiving unit 1710.

The receiving unit 1710 is further configured to receive a second voice instruction.

The processing unit 1720 is further configured to determine that the second voice instruction received by the receiving unit 1710 includes information about the device 1700, and respond to the second voice instruction.

It should be understood that, the device 1700 may be corresponding to a device in the communication method 600. In addition, the foregoing and other operations and/or functions of all modules/units of the device 1700 are separately used to implement corresponding procedures of the communication method 600 in FIG. 6. For brevity, details are not described herein again.

In this embodiment of the present disclosure, when a received voice instruction includes device information, the voice instruction is automatically responded to such that a device responding to a voice instruction can be intelligently selected, and more convenient and natural man-machine interaction experience is provided for a user.

Figure 18:
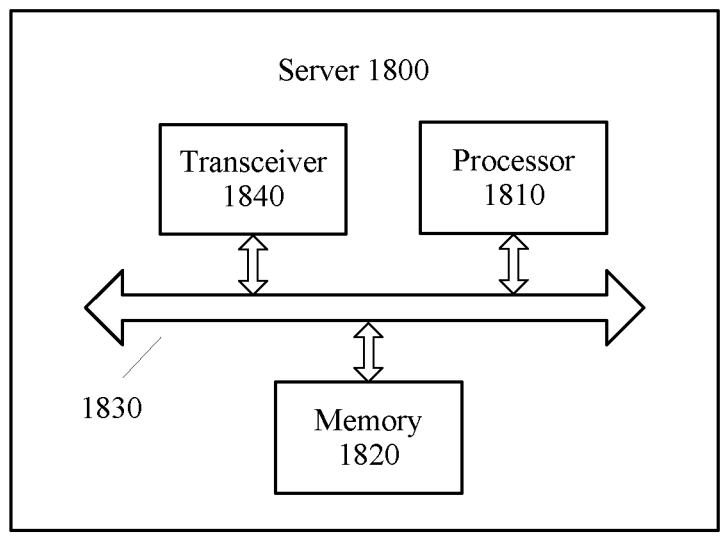
FIG. 18 is a schematic block diagram of a server according to another embodiment of the present disclosure.

FIG. 18 is a schematic block diagram of a server 1800 according to an embodiment of the present disclosure. The server 1800 communicates with multiple devices of one user, and the multiple devices can simultaneously receive a same voice instruction sent by the user. As shown in FIG. 18, the server 1800 includes one or more processors 1810, a memory 1820, a bus system 1830, a transceiver 1840, and one or more programs. The processor 1810, the memory 1820, and the transceiver 1840 are connected to each other using the bus system 1830. The one or more programs are stored in the memory 1820 and are configured for execution by the one or more processors 1810. The one or more programs include an instruction, and the instruction is used to receive, using the transceiver 1840, information sent by each device in multiple devices, where the information includes a device type, determine, according to at least the information received by the transceiver 1840, a device responding to a voice instruction in the multiple devices, and send, using the transceiver 1840, a message to a device different from the device responding to a voice instruction in the multiple devices, where the message is used to instruct a voice assistant of the different device not to respond to the voice instruction.

In this embodiment of the present disclosure, information sent by multiple devices of one user is received, and a device responding to a voice instruction is determined from the multiple devices according to the information. For a user having multiple different devices, a device responding to a voice instruction can be intelligently selected, and more convenient and natural man-machine interaction experience is provided for the user.

It should be understood that in this embodiment of the present disclosure, the processor 1810 may be a central processing unit (CPU), or the processor 1810 may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor 1810 may be any conventional processor, or the like.

The memory 1820 may include a read-only memory (ROM) and a random access memory (RAM), and provides an instruction and data to the processor 1810. A part of the memory 1820 may further include a nonvolatile RAM (NVRAM). For example, the memory 1820 may further store information about a device type.

In addition to a data bus, the bus system 1830 may include a power bus, a control bus, a status signal bus, and the like. However, for clarity of description, various buses are marked as the bus system 1830 in the diagram.

In an implementation process, steps of the methods may be completed using an integrated logic circuit of hardware in the processor 1810 or an instruction in a form of software. The steps of the methods disclosed with reference to the embodiments of the present disclosure may be directly performed by a hardware processor, or may be performed using a combination of hardware in the processor and a software module. The software module may be located in a mature storage medium in the art, such as a RAM, a flash memory, a ROM, a programmable ROM (PROM), an electrically-erasable PROM (EEPROM), or a register. The storage medium is located in the memory 1820. The processor 1810 reads information in the memory 1820, and completes the steps of the methods in combination with hardware of the processor 1810. To avoid repetition, details are not described herein again.

The memory 1820 may further store response priority information corresponding to multiple device types, and may further store priority information and the like that are of response devices corresponding to different device information, different scene modes, and different device types of one user.

Optionally, the information sent by each device may further include at least one of a scene mode of a device or a voice instruction.

When the information includes a device type and a voice instruction, the instruction is further used to recognize semantic meaning of the voice instruction, and determine, according to the device type and the semantic meaning of the voice instruction, the device responding to a voice instruction.

Optionally, when the information includes a device type and a voice instruction, the instruction is further used to determine an operation corresponding to the voice instruction, and send, using the transceiver 1840 to the device responding to a voice instruction, indication information that is used to indicate the operation.

It should be understood that, the server 1800 may be corresponding to a server in the communication method 200. In addition, the foregoing and other operations and/or functions of all modules/units of the server 1800 are separately used to implement corresponding procedures of the communication method 200 in FIG. 2. For brevity, details are not described herein again.

In addition, a computer readable medium is further provided, including a computer readable instruction that performs, when being executed, the following operations of performing operations in steps 210 to 230 in the communication method 200. Optionally, an operation in an optional step in the communication method 200 may be performed.

In addition, a computer program product is further provided, including the computer readable medium.

In this embodiment of the present disclosure, information sent by multiple devices of one user is received, and a device responding to a voice instruction is determined from the multiple devices according to the information. For a user having multiple different devices, a device responding to a voice instruction can be intelligently selected, and more convenient and natural man-machine interaction experience is provided for the user.

Figure 19:
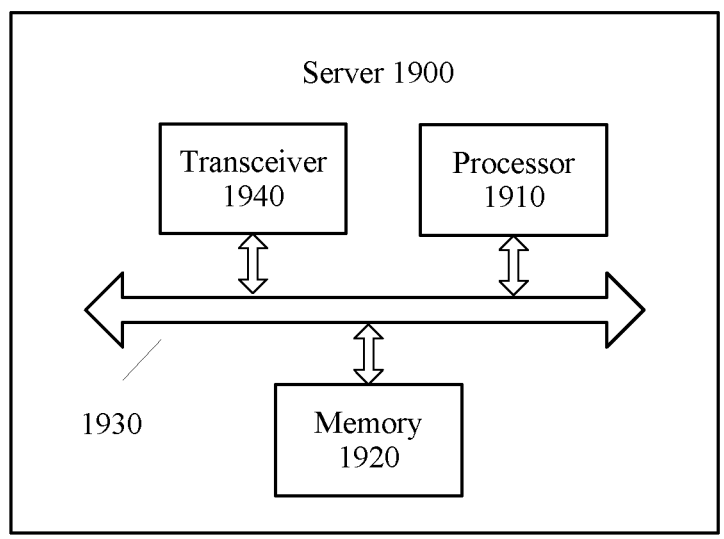
FIG. 19 is a schematic block diagram of a server according to another embodiment of the present disclosure.

FIG. 19 is a schematic block diagram of a server 1900 according to an embodiment of the present disclosure. The server 1900 communicates with multiple devices of one user, and the multiple devices can simultaneously receive a same voice instruction sent by the user. As shown in FIG. 19, the server 1900 includes one or more processors 1910, a memory 1920, a bus system 1930, a transceiver 1940, and one or more programs. The processor 1910, the memory 1920, and the transceiver 1940 are connected to each other using the bus system 1930. The one or more programs are stored in the memory 1920 and are configured for execution by the one or more processors 1910. The one or more programs include an instruction, and the instruction is used to receive, using the transceiver 1940, a same voice instruction sent by each device in multiple devices of one user, determine an operation corresponding to the voice instruction received by the transceiver 1940, and send, using the transceiver 1940 to a device responding to a voice instruction in the multiple devices, indication information that is used to indicate the operation, where the device responding to a voice instruction is determined according to information sent by each device in the multiple devices, and the information includes a device type.

Optionally, the information may further include at least one of a scene mode of a device or a voice instruction.

It should be understood that in this embodiment of the present disclosure, the processor 1910 may be a CPU, or the processor 1910 may be another general purpose processor, a DSP, an ASIC, an FPGA or another programmable logic device, a discrete gate or a transistor logic device, a discrete hardware component, or the like. The general purpose processor may be a microprocessor, or the processor may be any conventional processor, or the like.

The memory 1920 may include a ROM and a RAM, and provides an instruction and data to the processor 1910. A part of the memory 1920 may further include an NVRAM. For example, the memory 1920 may further store information about a device type.

In addition to a data bus, the bus system 1930 may include a power bus, a control bus, a status signal bus, and the like. However, for clarity of description, various buses are marked as the bus system 1930 in the diagram.

In an implementation process, steps of the methods may be completed using an integrated logic circuit of hardware in the processor 1910 or an instruction in a form of software. The steps of the methods disclosed with reference to the embodiments of the present disclosure may be directly performed by a hardware processor, or may be performed using a combination of hardware in the processor 1910 and a software module. The software module may be located in a mature storage medium in the art, such as a RAM, a flash memory, a ROM, a PROM, an EEPROM, or a register. The storage medium is located in the memory 1920. The processor 1910 reads information in the memory 1920, and completes the steps of the methods in combination with hardware of the processor 1910. To avoid repetition, details are not described herein again.

It should be understood that, the server 1900 may be corresponding to a server in the communication method 300. In addition, the foregoing and other operations and/or functions of all modules/units of the server 1900 are separately used to implement corresponding procedures of the communication method 300 in FIG. 3. For brevity, details are not described herein again.

In addition, a computer readable medium is further provided, including a computer readable instruction that performs, when being executed, the following operations of performing operations in steps 310 to 330 in the communication method 300. Optionally, an operation in an optional step in the communication method 300 may be performed.

In addition, a computer program product is further provided, including the computer readable medium.

In this embodiment of the present disclosure, indication information of an operation is automatically sent to a device responding to a voice instruction. For a user having multiple different devices, a device responding to a voice instruction can be intelligently selected, and more convenient and natural man-machine interaction experience is provided for the user.

Figure 20:
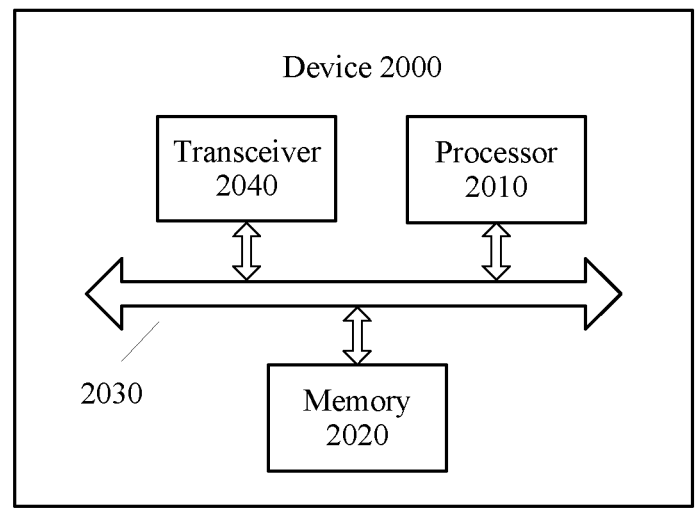
FIG. 20 is a schematic block diagram of a device according to another embodiment of the present disclosure.

FIG. 20 is a schematic block diagram of a device 2000 according to another embodiment of the present disclosure. Multiple devices of one user can simultaneously receive a same voice instruction sent by the user, and the device 2000 may be any device in the multiple devices. As shown in FIG. 20, the device 2000 includes one or more processors 2010, a memory 2020, a bus system 2030, a transceiver 2040, and one or more programs. The processor 2010, the memory 2020, and the transceiver 2040 are connected to each other using the bus system 2030. The one or more programs are stored in the memory 2020 and are configured for execution by the one or more processors 2010. The one or more programs include an instruction, and the instruction is used to receive a first voice instruction using the transceiver 2040, enter a wakeup state according to the first voice instruction received by the transceiver 2040, obtain information, where the information includes a device type, send the information to a server using the transceiver 2040, and receive, using the transceiver 2040, a first message sent by the server according to the information, where the first message is used to instruct a voice assistant of the device 2000 not to respond to a voice instruction, or receive, using the transceiver 2040, a second message sent by the server according to the information, where the second message is used to instruct a voice assistant of the device 2000 to respond to a voice instruction.

The instruction may be used to obtain the information about the device 2000 from the memory 2020.

In this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

It should be understood that in this embodiment of the present disclosure, the processor 2010 may be a CPU, or the processor 2010 may be another general purpose processor, a DSP, an ASIC, an FPGA or another programmable logic device, a discrete gate or a transistor logic device, a discrete hardware component, or the like. The general purpose processor may be a microprocessor, or the processor 2010 may be any conventional processor, or the like.

The memory 2020 may include a ROM and a RAM, and provides an instruction and data to the processor 2010. A part of the memory 2020 may further include an NVRAM. For example, the memory 2020 may further store information about a device type.

In addition to a data bus, the bus system 2030 may include a power bus, a control bus, a status signal bus, and the like. However, for clarity of description, various buses are marked as the bus system 2030 in the diagram.

In an implementation process, steps of the methods may be completed using an integrated logic circuit of hardware in the processor 2010 or an instruction in a form of software. The steps of the methods disclosed with reference to the embodiments of the present disclosure may be directly performed by a hardware processor, or may be performed using a combination of hardware in the processor and a software module. The software module may be located in a mature storage medium in the art, such as a RAM, a flash memory, a ROM, a PROM, an EEPROM, or a register. The storage medium is located in the memory 2020. The processor 2010 reads information in the memory 2020, and completes the steps of the methods in combination with hardware of the processor 2010. To avoid repetition, details are not described herein again.

Optionally, the information about the device 2000 may further include at least one of a scene mode of the device 2000 or a voice instruction.

Correspondingly, the instruction may be further used to receive, using the transceiver 2040, indication information that is sent by the server and is used to indicate an operation corresponding to a voice instruction, where the information further includes the voice instruction.

Optionally, the first message may further carry sleep instruction information, and the instruction may be further used to instruct the device 2000 to enter a sleep state according to the sleep instruction information.

Optionally, in another embodiment, the instruction is further used to receive a second voice instruction using the transceiver 2040 when the first message sent by the server is received using the transceiver 2040, and skip responding to the second voice instruction received by the transceiver 2040.

Optionally, in another embodiment, the instruction is further used to receive a third voice instruction using the transceiver 2040 when the second message sent by the server is received using the transceiver 2040, send the third voice instruction to the server using the transceiver 2040, receive, using the transceiver 2040, a third message sent by the server according to the third voice instruction, where the third message is used to indicate an operation corresponding to the third voice instruction, and perform, according to the third message, the operation corresponding to the third voice instruction.

It should be understood that, the device 2000 may be corresponding to a device in the communication method 400. In addition, the foregoing and other operations and/or functions of all modules/units of the device 2000 are separately used to implement corresponding procedures of the communication method 400 in FIG. 4. For brevity, details are not described herein again.

In addition, a computer readable medium is further provided, including a computer readable instruction that performs, when being executed, the following operations performing operations in steps 410 to 450 in the communication method 400. Optionally, an operation in an optional step in the communication method 400 may be performed.

In addition, a computer program product is further provided, including the computer readable medium.

In this embodiment of the present disclosure, information is obtained, and the information is sent to a server such that the server can determine a device responding to a voice instruction from multiple devices. For a user having multiple different devices, a device responding to a voice instruction can be intelligently selected, and more convenient and natural man-machine interaction experience is provided for the user.

Figure 21:
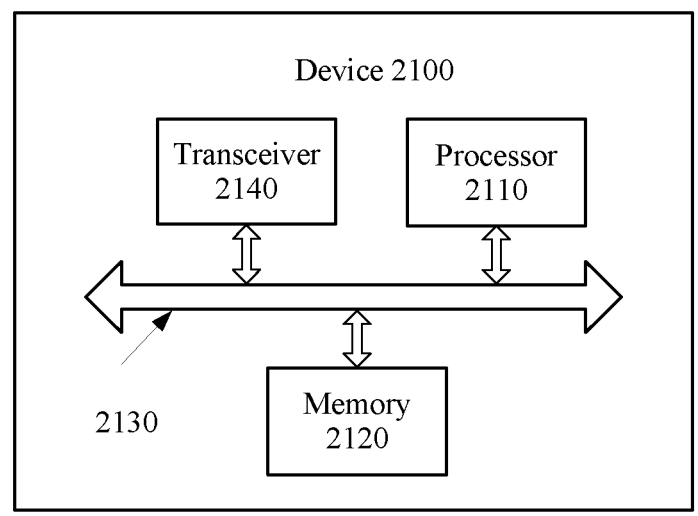
FIG. 21 is a schematic block diagram of a device according to another embodiment of the present disclosure.

FIG. 21 is a schematic block diagram of a device 2100 according to another embodiment of the present disclosure. Multiple devices of one user can simultaneously receive a same voice instruction sent by the user, and the device 2100 may be any device in the multiple devices. As shown in FIG. 21, the device 2100 includes one or more processors 2110, a memory 2120, a bus system 2130, a transceiver 2140, and one or more programs. The processor 2110, the memory 2120, and the transceiver 2140 are connected to each other using the bus system 2130. The one or more programs are stored in the memory 2120 and are configured for execution by the one or more processors 2110. The one or more programs include an instruction, and the instruction is used to receive a first voice instruction using the transceiver 2140, enter a wakeup state according to the first voice instruction, obtain information, where the information includes a device type send the information to a server using the transceiver 2140, receive a second voice instruction using the transceiver 2140, send the second voice instruction to the server using the transceiver 2140, and receive, using the transceiver 2140, indication information that is sent by the server according to the information and is used to indicate an operation corresponding to the second voice instruction.

The information may further include at least one of a scene mode of the device or a voice instruction.

It should be understood that in this embodiment of the present disclosure, the processor 2110 may be a CPU, or the processor 2110 may be another general purpose processor, a DSP, an ASIC, an FPGA or another programmable logic device, a discrete gate or a transistor logic device, a discrete hardware component, or the like. The general purpose processor may be a microprocessor, or the processor 2110 may be any conventional processor, or the like.

The memory 2120 may include a ROM and a RAM, and provides an instruction and data to the processor 2110. A part of the memory 2120 may further include an NVRAM. For example, the memory 2120 may further store information about a device type.

In addition to a data bus, the bus system 2130 may include a power bus, a control bus, a status signal bus, and the like. However, for clarity of description, various buses are marked as the bus system 2130 in the diagram.

In an implementation process, steps of the methods may be completed using an integrated logic circuit of hardware in the processor 2110 or an instruction in a form of software. The steps of the methods disclosed with reference to the embodiments of the present disclosure may be directly performed by a hardware processor, or may be performed using a combination of hardware in the processor 2110 and a software module. The software module may be located in a mature storage medium in the art, such as a RAM, a flash memory, a ROM, a PROM, an EEPROM, or a register. The storage medium is located in the memory 2120. The processor 2110 reads information in the memory 2120, and completes the steps of the methods in combination with hardware of the processor 2110. To avoid repetition, details are not described herein again.

It should be understood that, the device 2100 may be corresponding to a device in the communication method 500. In addition, the foregoing and other operations and/or functions of all modules/units of the device 2100 are separately used to implement corresponding procedures of the communication method 500 in FIG. 5. For brevity, details are not described herein again.

In addition, a computer readable medium is further provided, including a computer readable instruction that performs, when being executed, the following operations of performing operations in steps 510 to 570 in the communication method 500. Optionally, an operation in an optional step in the communication method 500 may be performed.

In addition, a computer program product is further provided, including the computer readable medium.

In this embodiment of the present disclosure, obtained information and a received voice instruction are sent to a server such that the server can determine, according to the information, a device responding to a voice instruction from multiple devices of one user, and send indication information of an operation corresponding to the voice instruction to the device responding to a voice instruction. For a user having multiple different devices, a device responding to a voice instruction can be intelligently selected, and more convenient and natural man-machine interaction experience is provided for the user.

Figure 22:
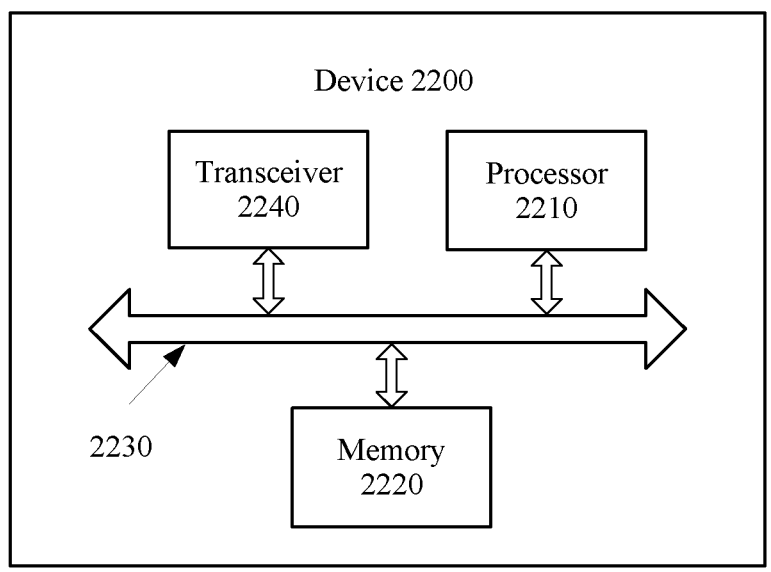
FIG. 22 is a schematic block diagram of a device according to another embodiment of the present disclosure.

FIG. 22 is a schematic block diagram of a device 2200 according to another embodiment of the present disclosure. Multiple devices of one user can simultaneously receive a same voice instruction sent by the user, and the device 2200 may be any device in the multiple devices. As shown in FIG. 22, the device 2200 includes one or more processors 2210, a memory 2220, a bus system 2230, a transceiver 2240, and one or more programs. The processor 2210, the memory 2220, and the transceiver 2240 are connected to each other using the bus system 2230. The one or more programs are stored in the memory 2220 and are configured for execution by the one or more processors 2210. The one or more programs include an instruction, and the instruction is used to receive a first voice instruction using the transceiver 2240, enter a wakeup state according to the first voice instruction, receive a second voice instruction using the transceiver 2240, and determine that the second voice instruction includes information about the device 2200, and respond to the second voice instruction.

It should be understood that in this embodiment of the present disclosure, the processor 2210 may be a CPU, or the processor 2210 may be another general purpose processor, a DSP, an ASIC, an FPGA or another programmable logic device, a discrete gate or a transistor logic device, a discrete hardware component, or the like. The general purpose processor may be a microprocessor, or the processor 2210 may be any conventional processor, or the like.

The memory 2220 may include a ROM and a RAM, and provides an instruction and data to the processor 2210. A part of the memory 2220 may further include an NVRAM. For example, the memory 2220 may further store information about a device type.

In addition to a data bus, the bus system 2230 may include a power bus, a control bus, a status signal bus, and the like. However, for clarity of description, various buses are marked as the bus system 2230 in the diagram.

In an implementation process, steps of the methods may be completed using an integrated logic circuit of hardware in the processor 2210 or an instruction in a form of software. The steps of the methods disclosed with reference to the embodiments of the present disclosure may be directly performed by a hardware processor, or may be performed using a combination of hardware in the processor 2210 and a software module. The software module may be located in a mature storage medium in the art, such as a RAM, a flash memory, a ROM, a PROM, an EEPROM, or a register. The storage medium is located in the memory 2220. The processor 2210 reads information in the memory 2220, and completes the steps of the methods in combination with hardware of the processor 2210. To avoid repetition, details are not described herein again.

It should be understood that, the device 2200 may be corresponding to a device in the communication method 600. In addition, the foregoing and other operations and/or functions of all modules/units of the device 2200 are separately used to implement corresponding procedures of the communication method 600 in FIG. 6. For brevity, details are not described herein again.

In addition, a computer readable medium is further provided, including a computer readable instruction that performs, when being executed, the following operations of performing operations in steps 610 to 640 in the communication method 600. Optionally, an operation in an optional step in the communication method 600 may be performed.

In addition, a computer program product is further provided, including the computer readable medium.

In this embodiment of the present disclosure, when a received voice instruction includes device information, the voice instruction is automatically responded to such that a device responding to a voice instruction can be intelligently selected, and more convenient and natural man-machine interaction experience is provided for a user.

It should be understood that, the term "and/or" in this embodiment of the present disclosure describes only an association relationship for describing associated objects and represents that three relationships may exist. For example, A and/or B may represent the following three cases, only A exists, both A and B exist, and only B exists.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the system, apparatus, and unit, reference may be made to a corresponding process in the method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The storage medium includes any medium that can store program code, such as a universal serial bus (USB) flash drive, a removable hard disk, a ROM, a RAM, a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
receiving information from each device in a plurality of devices of one user, wherein the information comprises a device type and a current scene mode of each device, and wherein the current scene mode of the device comprises a driving mode, an exercising mode, a working mode, a headset mode, or a loudspeaker mode;
determining a device responding to a voice instruction in the plurality of devices based on a pre-stored correspondence between the device responding to the voice instruction, the device type, the current scene mode, and a priority order corresponding to each device; and
sending a message to a device different from the device responding to the voice instruction in the plurality of devices, wherein the message instructs a voice assistant of the different device not to respond to the voice instruction.

2. The communication method of claim 1, wherein determining the device responding to the voice instruction in the plurality of devices further comprises:

recognizing semantic meaning of the voice instruction; and determining, according to the device type, the current scene mode, and the semantic meaning of the voice instruction, the device responding to the voice instruction.

3. The communication method of claim 1, further comprising:
   determining an operation corresponding to the voice instruction; and
   sending, to the device responding to the voice instruction, indication information indicating the operation.

4. A communication method, comprising:
   receiving a first voice instruction;
   entering a wakeup state according to the first voice instruction;
   obtaining information comprising a device type and a current scene mode of a device, wherein the current scene mode of the device comprises a driving mode, an exercising mode, a working mode, a headset mode, or a loudspeaker mode;
   sending the information to a server; and
   receiving a first message or a second message from the server based on a pre-stored correspondence between the device responding to a voice instruction, the device type, the current scene mode, and a priority order corresponding to each device, wherein the first message instructs a voice assistant of a different device not to respond to the voice instruction, and wherein the second message instructs the voice assistant of the device to respond to the voice instruction.

5. The communication method of claim 4, further comprising receiving indication information indicating an operation corresponding to the voice instruction from the server, wherein the information further comprises the voice instruction.

6. The communication method of claim 4, wherein when receiving the first message from the server, the method further comprises:
   receiving a second voice instruction; and
   skip responding to the second voice instruction.

7. The communication method of claim 4, wherein when receiving the second message from the server, the method further comprises:
   receiving a third voice instruction;
   sending the third voice instruction to the server;
   receiving a third message from the server according to the third voice instruction, wherein the third message indicates an operation corresponding to the third voice instruction; and
   performing, according to the third message, the operation corresponding to the third voice instruction.

8. A device comprising:
   one or more processors;
   a memory configured to store one or more programs;
   a bus system; and
   a transceiver, wherein the one or more processors, the memory, and the transceiver are coupled to each other using the bus system, and
   wherein when executed, the one or more programs stored in the memory cause the one or more processors to be configured to:
      receive a first voice instruction using the transceiver;
      enter a wakeup state according to the first voice instruction;
      obtain information comprising a device type and a current scene mode of a device, wherein the current scene mode of the device comprises a driving mode, an exercising mode, a working mode, a headset mode, or a loudspeaker mode;
      send the information to a server using the transceiver; and
      receive, using the transceiver, a first message or a second message from the server based on a pre-stored correspondence between the device responding to a voice instruction, the device type, the current scene mode, and a priority order corresponding to each device, wherein the first message instructs a voice assistant of a different device not to respond to the voice instruction, and wherein the second message instructs the voice assistant of the device to respond to the voice instruction.

9. The device of claim 8, wherein the one or more programs stored in the memory further cause the one or more processors to be configured to receive, using the transceiver, indication information indicating an operation corresponding to the voice instruction from the server, and wherein the information further comprises the voice instruction.

10. The device of claim 8, wherein the one or more programs stored in the memory further cause the one or more processors to be configured to:
   receive a second voice instruction using the transceiver when the first message is received; and
   skip responding to the second voice instruction.

11. The device of claim 8, wherein the one or more programs stored in the memory further cause the one or more processors to be configured to:
   receive a third voice instruction using the transceiver when the second message is received;
   send the third voice instruction to the server using the transceiver;
   receive, using the transceiver, a third message from the server according to the third voice instruction, wherein the third message indicates an operation corresponding to the third voice instruction; and
   perform, according to the third message, the operation corresponding to the third voice instruction.

12. The communication method of claim 1, wherein the message further comprises sleep instruction information.

13. The communication method of claim 12, wherein the message instructs the voice assistant of the different device to enter a sleep state according to the sleep instruction information.

14. The communication method of claim 4, wherein the first message further comprises sleep instruction information.

15. The communication method of claim 14, wherein the first message instructs the voice assistant of the different device to enter a sleep state according to the sleep instruction information.

16. The device of claim 8, wherein the first message further comprises sleep instruction information.

17. The device of claim 16, wherein the first message instructs the voice assistant of the different device to enter a sleep state according to the sleep instruction information.

18. The device of claim 8, wherein the current scene mode of the device further comprises a living room mode and a bedroom mode.

19. The device of claim 8, wherein the pre-stored correspondence is stored in the server.

20. The communication method of claim 4, wherein the pre-stored correspondence is stored in the server.

\* \* \* \* \*